(12) United States Patent
Kaneko et al.

(10) Patent No.: US 6,600,511 B1
(45) Date of Patent: Jul. 29, 2003

(54) CAMERA FOR USE IN PHOTOGRAMMETRIC ANALYTICAL MEASUREMENT

(75) Inventors: Atsumi Kaneko, Tokyo (JP); Toshihiro Nakayama, Saitama (JP); Atsushi Kida, Saitama-Ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/003,589

(22) Filed: Jan. 6, 1998

(30) Foreign Application Priority Data

Jan. 8, 1997 (JP) .............................. 9-013138
Sep. 12, 1997 (JP) .............................. 9-268066

(51) Int. Cl.$^7$ .............................................. H04N 5/76
(52) U.S. Cl. .................................... 348/231.3; 382/154
(58) Field of Search ................................ 348/231, 230, 348/232, 233, 207, 211, 333.02, 42, 46, 36, 49, 50, 144, 155, 39, 51, 231.99, 231.3, 207.99, 211.1; 396/50, 296, 429; 358/906, 909.1; 382/154, 103, 151, 190, 285, 106; 386/46, 95, 117

(56) References Cited

U.S. PATENT DOCUMENTS 5,262,867 A * 11/1993 Kojima ...................... 348/232
5,335,072 A    8/1994 Tanaka et al.
5,647,019 A *  7/1997 Iino et al. .................. 382/154
5,699,444 A * 12/1997 Palm ......................... 382/106
5,764,291 A *  6/1998 Fullam ........................ 396/50
5,794,078 A *  8/1998 Okazaki ...................... 396/50
5,900,909 A *  5/1999 Parulski et al. ............. 348/232
6,031,941 A *  2/2000 Yano et al. ................. 382/154
6,144,761 A * 11/2000 Kaneko et al. ............. 382/154
6,282,362 B1 * 8/2001 Murphy et al. ............. 348/232
6,292,215 B1 * 9/2001 Vincent ...................... 348/232

FOREIGN PATENT DOCUMENTS

JP    5336419     12/1993
JP    6-67293      3/1994
JP    08-285588  * 1/1996
JP    8285585    11/1996

OTHER PUBLICATIONS

English Language Abstract of Japan Laid–Open Publication No. HEI 8–285588.

* cited by examiner

*Primary Examiner*—Aung S. Moe
(74) *Attorney, Agent, or Firm*—Greenblum & Bernstein, P.L.C.

(57) ABSTRACT

A camera is used in a photogrammetric analytical measurement, performing photography at each photographing position, and has a relative-position-detecting system for three-dimensionally detecting a relative-positional relationship between different photographing positions. The relative-position-detecting system is associated with a three-dimensional coordinate system, defined in the camera, such that an origin of the three-dimensional coordinate system is situated at a back principal point of the camera, and is constituted so as to detect the relative-positional relationship between the different photographing positions, with respect to the three-dimensional coordinate system.

13 Claims, 15 Drawing Sheets

CAMERA FOR USE IN PHOTOGRAMMETRIC ANALYTICAL MEASUREMENT

BACKGROUND OF THE INVENTION

1. Field of the Invention

This invention relates to a camera for use in a photogrammetric analytical measurement, in which a survey map is produced on the basis of a set of photographed pictures obtained at two different photographing positions.

2. Description of the Related Art

For example, photogrammetry is carried out at a traffic accident spot. The traffic accident spot is photographed by a camera in at least two different positions, and a survey map of the traffic accident spot is produced based on a set of photographed pictures obtained at the different positions.

In particular, a two-dimensional coordinate system is defined on each of the photographed pictures, and two-dimensional positions of the objects, which are recorded on each picture, are determined by the two-dimensional coordinate system. Then, a three-dimensional coordinate system is defined on the basis of the two sets of two-dimensional coordinate systems, and three-dimensional positions of the recorded objects are determined from the three-dimensional coordinate system. Accordingly, it is possible to produce a survey map of the traffic accident spot by drawing the objects on a sheet of paper in such a manner that the objects are projected on one of the three planes defined by the three-dimensional system.

Before accurately scaled distances and lengths can be reproduced on the survey map, a standard measurement scale must be recorded together with the objects in the photographed pictures. Also, a standard reference plane, on which the survey map should be drawn, must be defined in the photographed pictures.

Usually, in order to define the standard measurement scale and the reference plane, three respective cone-shaped markers, which are identical to each other, are positioned at suitable locations around a traffic accident spot. Namely, a distance between two apexes of the cone-shaped markers is measured, for example, with a measuring tape, and set as the standard measurement scale, and a plane, defined by the three apexes of the cone-shaped markers, is utilized as the reference plane.

Before the three-dimensional positions of the objects can be determined using the three-dimensional coordinate system, a relative-positional relationship between the photographing positions should be derived from the three-dimensional coordinate system. Nevertheless, a very circuitous and convoluted process is required to calculate the relative-positional relationship between the photographing positions. For this reason, conventionally, the relative-positional relationship between the photographing positions is obtained by iterating approximate calculations using a computer. However, use of an iterative process creates a protracted survey map development time.

SUMMARY OF THE INVENTION

Therefore, an object of the present invention is to provide a camera for use in a photogrammetric analytical measurement, performing photography at each photographing position, which is provided with a relative-position-detecting system for deriving a relative-positional relationship between the different photographing positions.

In accordance with an aspect of the present invention, there is provided a camera for use in a photogrammetric analytical measurement, performing photography at a photographing position, comprising a relative-position-detecting system for three-dimensionally detecting a relative-positional relationship between different photographing positions.

Preferably, the relative-position-detecting system is associated with a three-dimensional coordinate system defined in the camera such that an origin of the three-dimensional coordinate system is situated at a suitable position with respect to the camera, and is constituted so as to detect the relative-positional relationship between the different photographing positions with respect to the three-dimensional coordinate system. The suitable position may be a back principal point of the camera.

Preferably, the three-dimensional coordinate system has a first axis extending vertically with respect to the Earth, and second and third axes extending horizontally from the origin of the three-dimensional coordinate system so as to be perpendicular to each other.

The relative-position-detecting system may comprise three respective rotational-angle sensors for detecting rotational-angular movement data around the first, second and third axes of the three-dimensional coordinate system, and three respective acceleration sensors for detecting acceleration data along the first, second and third axes of the three-dimensional coordinate system. Preferably, one of the three rotational-angle sensors for detecting the rotational-angular movement around the first axis of the three-dimensional coordinate system comprises a magnetic azimuth sensor.

The relative-position-detecting system may further comprise a first calculator for calculating relative-three-dimensional angular data between the different photographing positions on the basis of the rotational-angular movement data detected by the rotational-angle sensors at the different photographing positions, and a second calculator for calculating relative-three-dimensional translational movement data between the different photographing positions on the basis of the acceleration data detected by the acceleration sensors at the different photographing positions. The relative-position-detecting system may further comprise a third calculator for calculating relative-three-dimensional positional data between the different photographing positions on the basis of the relative-three-dimensional translational movement data calculated by the second calculator.

Furthermore, the camera may further comprise a detachable memory medium for storing image data photographed by the camera, along with the relative-three-dimensional angular data and the relative-three-dimensional positional data.

With executing a photographing operation at two different consecutive photographing positions, the relative-position-detecting system may further comprise a fourth calculator for calculating differential-angular data with respect to two consecutive relative-three-dimensional angular data derived from the different photographing positions, and a fifth calculator for calculating differential-positional data with respect to two consecutive relative-three-dimensional positional data derived from the different photographing positions. In this case, preferably, the detachable memory medium further stores the differential-angular data, and the differential-positional data. On the other hand, the detachable memory medium may stores the image data photographed by the camera, together with the differential-angular data and the differential-positional data in place of the relative-three-dimensional angular data and the relative-three-dimensional positional data.

In accordance with another aspect of the present invention, there is provided a memory medium storing image data, photographed by a camera, and relative-three-dimensional angular data and relative-three-dimensional positional data, which specify an photographing position of the camera.

Preferably, in the memory medium, the relative-three-dimensional angular data and the relative-three-dimensional positional data are associated with a three-dimensional coordinate system defined in the camera. An origin of the three-dimensional coordinate system may be situated at a suitable position with respect to the camera. Also, preferably, the three-dimensional coordinate system has a first axis extending vertically with respect to the Earth, and second and third axes extending horizontally from the origin of the three-dimensional coordinate system so as to be perpendicular to each other.

The memory medium may further store differential-angular data, generated from two consecutive relative-three-dimensional angular data derived from different consecutive photographing positions at which is executed, and differential-positional data, generated from the two consecutive relative-three-dimensional positional data derived from the different consecutive photographing positions.

In accordance with yet another aspect of the present invention, there is provided a memory medium storing image data photographed by a camera, together with differential-angular data, obtained with respect to two consecutive relative-three-dimensional angular data derived from different consecutive photographing positions at which a photographing operation is executed, and differential-positional data, obtained with respect to two consecutive relative-three-dimensional positional data derived from the different consecutive photographing positions.

Preferably, in this memory medium, the differential-angular data and the differential-positional data are associated with a three-dimensional coordinate system defined in the camera. An origin of the three-dimensional coordinate system is situated at a suitable position with respect to the camera. Also, preferably, the three-dimensional coordinate system has a first axis extending vertically with respect to the Earth, and second and third axes extending horizontally from the origin of the three-dimensional coordinate system so as to be perpendicular to each other.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

Figure 1:
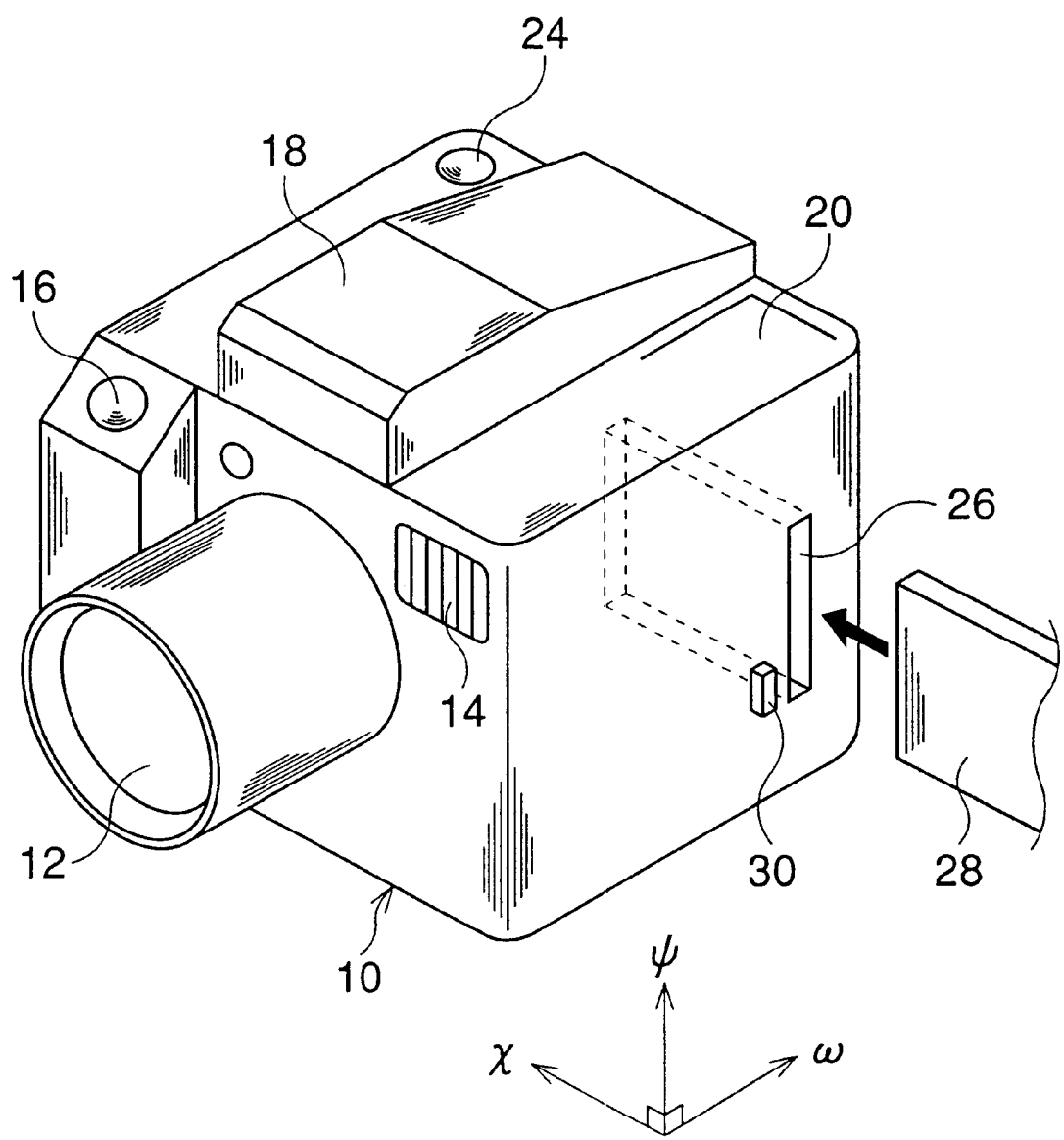
FIG. 1 is a schematic perspective view showing an appearance of an electronic still video camera, according to the present invention.

FIG. 1 is an external view of an electronic still video camera, according to the present invention, which comprises: a camera body 10; a photographing optical system 12 provided at an approximately central location on a front surface of the camera body 10; an electronic flash 14 disposed on the front surface of the camera body 10, above and to the right side of the photographing optical system 12; and a release switch button 16 provided on the front, on a side opposite to the electronic flash 14, relative to the photographing optical system 12.

Also, the camera is provided with a view finder 18, provided centrally on the top surface of the camera body 10, an LCD (liquid crystal display) panel 20 provided on the top surface, to one side of the view finder 18, and a power switch button 24 provided on the other side of the view finder 18. Further, the camera body 10 has an elongated slot 26 formed in a side wall thereof, and a recording medium 28, such as an IC memory card, is loaded into and unloaded from the camera through the elongated slot 26. Note, in FIG. 1, reference numeral 30 indicates a button for unloading the IC memory card 28 from the camera by ejection through the elongated slot 26.

Note, although not visible in FIG. 1, an LCD-type monitor (indicated by reference 62 in FIG. 2) is incorporated in a rear wall of the camera body 10, and a photographed image can be reproduced and observed on the monitor.

Figure 2:
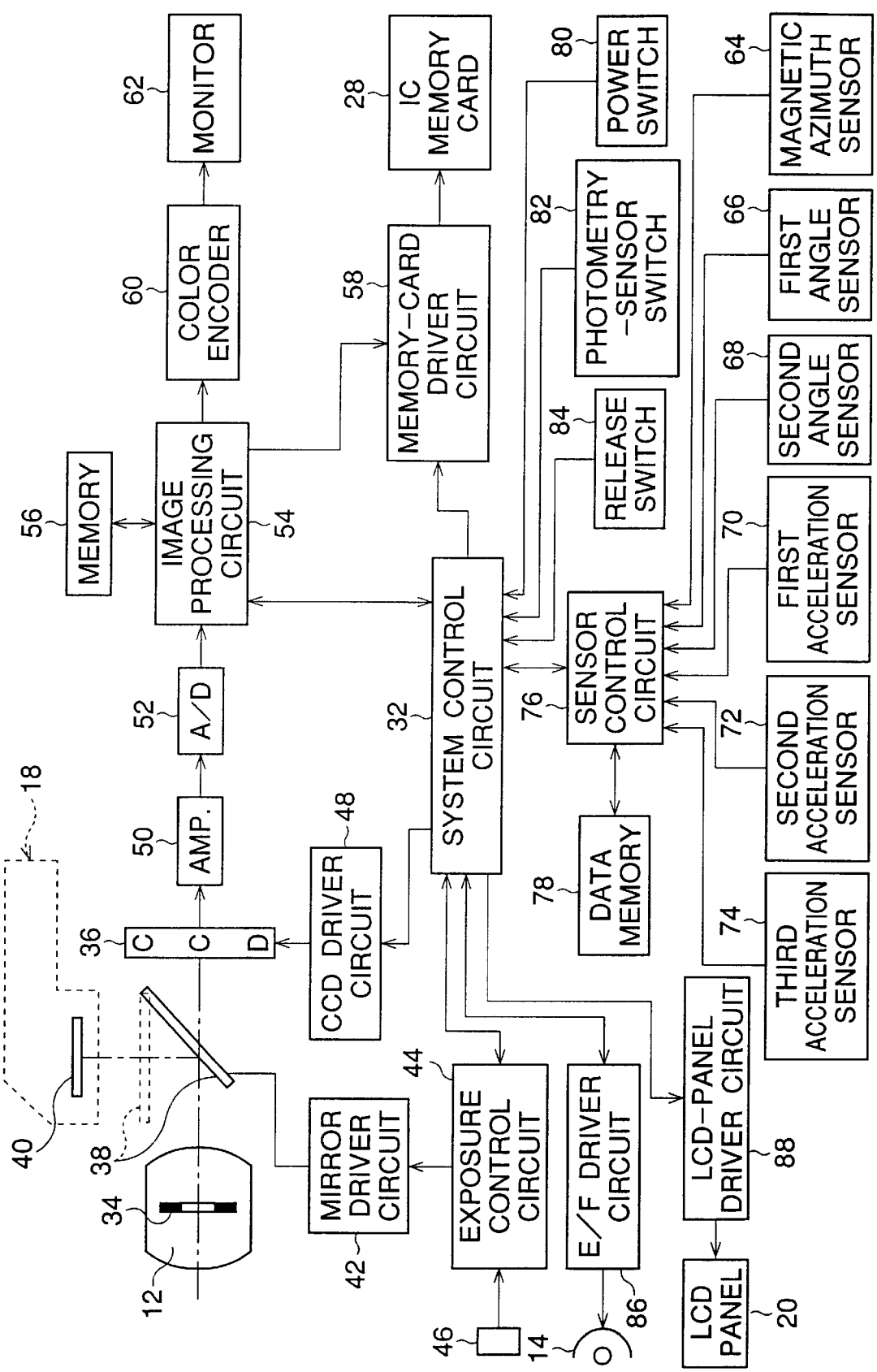
FIG. 2 is a block diagram of the electronic still video camera shown in FIG. 1.

FIG. 2 shows a block diagram of the camera according to the present invention. In this block diagram, reference 32 indicates a system control circuit, including a microcomputer or microprocessor, a read-only memory (ROM), and a random-access-memory (RAM), etc., use to control the camera as a whole.

The photographing optical system 12 comprises a plurality of lens groups and an aperture or diaphragm 34 incorporated therein. A solid area image sensor 36, disposed behind the photographing optical system 12, serves as a photoelectric-conversion device. Preferably, the solid area image sensor 36 is constituted as a CCD (charge-coupled device) area image sensor. A quick return mirror 38 is placed between the photographing optical system 12 and the CCD image sensor 36, and a focusing glass 40, included in a view finder optical system of the view finder 18, is disposed above the quick return mirror 38.

The quick return mirror 38 is driven by a mirror driver circuit 42, so as to be moved between a down-position (i.e. the inclined position shown by the solid lines in FIG. 2) and an up-position (i.e. the horizontal position shown by the broken lines in FIG. 2). The mirror driver circuit 42 is controlled by an exposure control circuit 44, having a photometry sensor 46 connected thereto, which is operated under control of the system control circuit 32 based on an output signal of the photometry sensor 46.

The quick return mirror 38 is usually in the down-position or the inclined position, and thus light beams, passing through the photographing optical system 12, are directed to the optical system of the viewfinder 18, so that an object to be photographed can be observed through the viewfinder 18 by a photographer. When a photographing operation is executed, the quick return mirror 38 is rotated upward by the mirror driver circuit 42, being then in the up-position, so that the light beams, passing through the photographing optical system 12, are directed to a light-receiving area of the CCD area image sensor 36. Namely, due to the photographing optical system 12, an optical image is formed on the light-receiving area of the CCD area image sensor 36.

Note, although not shown in FIG. 2, an iris driver circuit is provided to drive the diaphragm 34, and is controlled by the exposure control circuit 44.

The CCD area image sensor 36 has an electronic shutter function, whereby a time of exposure (i.e. a time of electric charge accumulation) is regulated by the electronic shutter function of the CCD area image sensor 36 based on an output signal of the photometry sensor 46. After the time of exposure has elapsed, the quick return mirror 38 is returned from the up-position to the down-position. During the time of exposure, the CCD area image sensor 36 converts the optical image into electrical pixel signals. The converted electrical pixel signals are read out from the CCD area image sensor 36 by a CCD driver circuit 48, which is operated under control of the system control circuit 32.

The pixel signals read out of the CCD area image sensor 36 are amplified by an amplifier 50, and are then converted to digital pixel signals by an analog-to-digital (A/D) converter 52. The digital pixel signals are subjected to a shading correction, a gamma correction, and so on by an image-processing circuit 54, under control of the system control circuit 32, and are then temporarily stored in a memory 56, having a capacity for storing a frame of digital pixel signals outputted from the CCD area image sensor 36.

The pixel signals outputted from the memory 56 are fed to a memory-card driver circuit 58, by which the fed pixel signals are stored as a frame of pixel data in the IC memory card 28. Also, the frame of pixel signals may be outputted from the memory 56 into a color encoder 60, which produces a color video signal on the basis of the frame of pixel signals, the color video signal then being fed to an LCD-type monitor 62, on which the photographed image is reproduced and observed. Note, as mentioned above, the LCD-type monitor 62 is provided in the rear wall of the camera body 10.

In this embodiment, the camera is provided with a position-detecting system for detecting a relative-movement of the camera, which includes a magnetic azimuth sensor 64, a first rotational-angle sensor 66, a second rotational-angle sensor 68, a first acceleration sensor 70, a second acceleration sensor 72, and a third acceleration sensor 74. These sensors 64, 66, 68, 70, 72 and 74 are connected to the system control circuit 32 through the intermediary of a sensor control circuit 76, which includes a microcomputer or microprocessor, a read-only memory (ROM), and a random-access-memory (RAM), etc., used to control the sensors 64, 66, 68, 70, 72 and 74.

The position-detecting system (64, 66, 68, 70, 72 and 74) is associated with a $\chi$-$\psi$-$\omega$ three-dimensional coordinate system as shown in FIG. 1. For the sake of convenience of illustration, although the $\chi$-$\psi$-$\omega$ three-dimensional coordinate system is separated from the camera, this three-dimensional coordinate system is preferably defined in the camera such that an origin of the coordinate system is situated at a back principal point of the photographing optical system 12 of the camera. A $\psi$-axis of the $\chi$-$\psi$-$\omega$ three-dimensional coordinate system extends vertically with respect to the Earth, and the remaining $\chi$- and $\omega$-axes thereof extend horizontally from the origin so as to be perpendicular to each other.

The magnetic azimuth sensor 64 detects angular-movement data of the camera around the $\psi$-axis of the $\chi$-$\psi$-$\omega$ three-dimensional coordinate system. Namely, by using the magnetic azimuth sensor 64, the angular-movement data of the camera around the $\psi$-axis is detected as absolute angle data with respect to a direction defined by a terrestrial magnetism. The first and second rotational-angle sensors 66 and 68 detect angular-movement data of the camera around the respective $\chi$- and $\omega$-axes of the $\chi$-$\psi$-$\omega$ three-dimensional coordinate system. The sensor control circuit 76 calculates three-dimensional angular data of the camera based on the three-dimensional angular-movement data detected by the sensors 64, 66 and 68. In short, three-dimensional angles of the optical axis of the photographing optical system 12 of the camera are detected by the sensors 64, 66 and 68 with respect to the vertical axis or $\psi$-axis of the $\chi$-$\psi$-$\omega$ three-dimensional coordinate system.

Further, the first, second and third acceleration sensors 70, 72 and 74 detect acceleration data of the camera along the respective $\psi$-, $\chi$- and $\omega$-axes of the $\chi$-$\psi$-$\omega$ three-dimensional coordinate system, and the detected acceleration data represents translational-movement data of the camera along the respective $\psi$-, $\chi$- and $\omega$-axes of the $\chi$-$\psi$-$\omega$ three-dimensional coordinate system. The sensor control circuit 76 calculates the three-dimensional translational-movement data, and further, based on the three-dimensional translational-movement data, calculates the three-dimensional positional data of the camera.

The sensor control circuit 76 is operated under control of the system control circuit 32, and drives each of the sensors 64, 66, 68, 70, 72 and 74. The sensor control circuit 76 is provided with a data-memory 78 which temporarily stores the three-dimensional angular data, derived from the sensors 64, 66 and 68, and the three-dimensional positional data, derived from the sensors 70, 72 and 74.

Each of the sensors 64, 66, 68, 70, 72 and 74 should ideally be arranged in the camera so as to be located at the origin of the χ-ψ-ω three-dimensional coordinate system, i.e. at the back principal point of the photographing optical system 12 of the camera, but the arrangement of each sensor at the back principal point of the optical system 12 is, in reality, impossible.

Accordingly, each of the sensors 64, 66, 68, 70, 72 and 74 must be arranged so as to be offset from the back principal point of the photographing optical system 12, and thus the three-dimensional angular data and the three-dimensional positional data must be corrected in accordance with offset-distance data, which is preprogrammed on the basis of respective offset distances of the sensors from the back principal point of the optical system 12. The data-memory 78 is also used to store the offset-distance data.

As shown in FIG. 2, the camera is provided with a power switch 80, which is associated with the power switch button 24, such that the power switch 80 is powered ON or OFF by depressing the power switch button 24 (FIG. 1). Also, the camera is provided with a photometry-sensor switch 82 and a release switch 84, both being associated with the release switch button 16 (FIG. 1). In particular, when the release switch button 16 is half depressed, the photometry-sensor switch 82 is turned ON, and, when the release switch button 16 is fully depressed, the release switch 84 is turned ON. Note, the power switch 80 and the release switch 84 are associated with the sensor control circuit 76 for driving the sensors 64, 66, 68, 70, 72 and 74, as explained in detail hereinafter.

Further, as shown in FIG. 2, the electronic flash 14 is electrically energized by an electronic flash driver circuit 86, operated under control of the system control circuit 32. The electrical energization of the electronic flash 14 is carried out as soon as the release switch button 16 is fully depressed, if necessary. Also, the LCD panel 20 is connected-to the system control circuit 32, through an LCD-panel driver circuit 88, to display various setting conditions of the camera, suitable messages, and so on.

Figure 3:
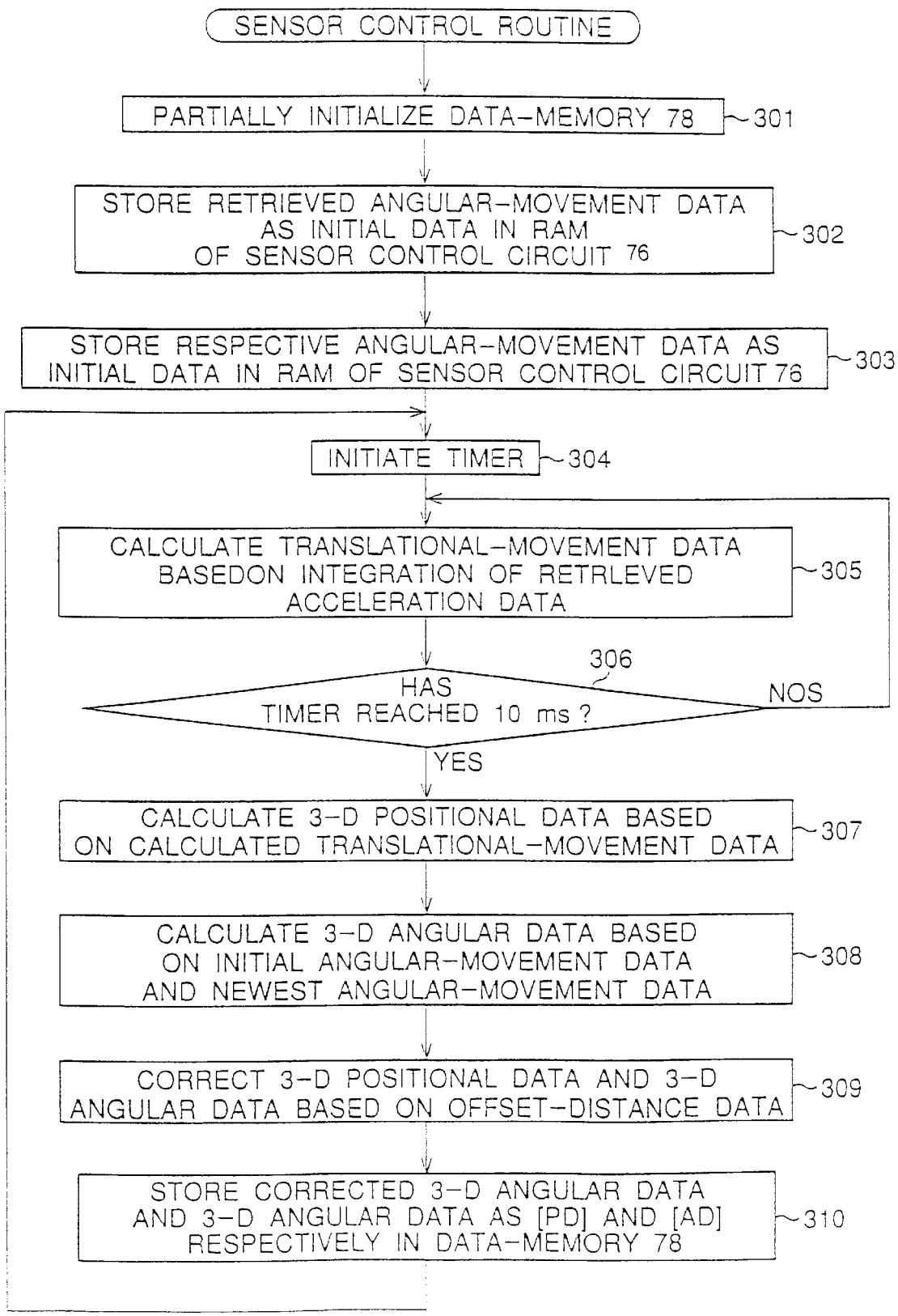
FIG. 3 is a flowchart of a sensor control routine, executed in a sensor control circuit included in the block diagram shown in FIG. 2.

FIG. 3 shows a flowchart for a sensor control routine, executed in the sensor control circuit 76, being initiated by depressing the power switch button 24 which turns ON the power switch 80. Note, preferably, the depression of the power switch button 24, and therefore, the turning-ON of the power switch 80, is carried out after the camera is mounted on a tripod, which is positioned at a suitable location to photogrammetrically measure a desired area.

At step 301, the data-memory 78 is partially initialized, i.e. a storage area of the data-memory 78 for storing three-dimensional angular data and three-dimensional positional data of the camera is cleared.

At step 302, angular-movement data, derived from angular-movements of the camera around the respective ψ-, χ- and ω-axes of the χ-ψ-ω three-dimensional coordinate system, are retrieved from the sensors 64, 66 and 68, and acceleration data, derived from accelerative-movements of the camera along the respective ψ-, χ- and ω-axes of the χ-ψ-ω three-dimensional coordinate system, are retrieved from the sensors 70, 72 and 74. For example, the retrieval of the angular-movement data and the acceleration data is successively executed at time-intervals of 1 ms.

At step 303, the angular-movement data, retrieved initially from the sensors 64, 66 and 68, are stored as initial data in the RAM of the sensor control circuit 76.

At step 304, a timer, which is included in the sensor control circuit 76, is initiated, and the control proceeds to step 305, in which three-dimensional translational-movement data are calculated on the basis of an integration of the acceleration data retrieved from the sensors 70, 72 and 74. At step 306, it is determined whether or not the timer has reached a count of 10 ms. If a time of 10 ms has not elapsed, the control returns to step 305. Namely, the calculation is successively executed based on the retrieval of acceleration data at the time-intervals of 1 ms, until the time of 10 ms has elapsed.

When the time of 10 ms has elapsed, the control proceeds from step 306 to step 307, in which three-dimensional positional data are calculated on the basis of the calculated translational-movement data. Then, at step 308, three-dimensional angular data are calculated on the basis of the initial angular-movement data, stored in the RAM of the sensor control circuit 76, and newest angular-movement data, obtained after the time of 10 ms has elapsed.

At step 309, the three-dimensional positional data and the three-dimensional angle data are corrected on the basis of the offset-distance data previously stored in the data-memory 78. Then, at step 310, the corrected positional data and angular data are stored as respective data [PD] and data [AD] in the data-memory 78. Thereafter, the control returns from 310 to step 304. Namely, the three-dimensional positional data [PD] and the three-dimensional angular data [AD] are renewed every time 10 ms has elapsed.

Figure 4:
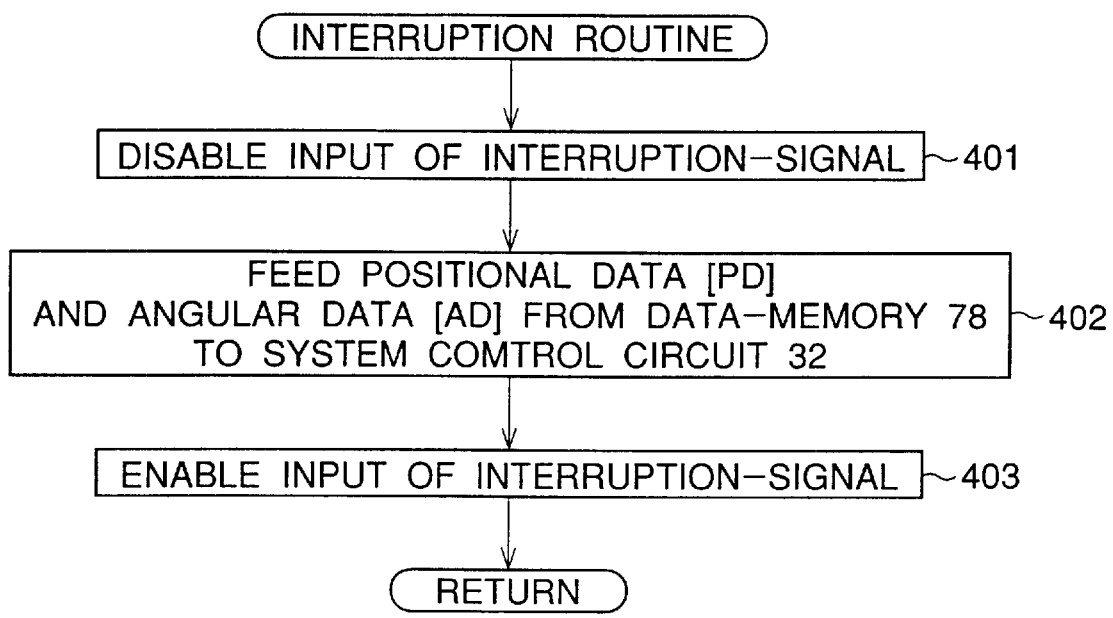
FIG. 4 is a flowchart of an interruption routine, executed in the sensor control circuit of FIG. 2.

FIG. 4 shows a flowchart for an interruption routine executed in the sensor control circuit 76. The execution of the interruption routine is initiated by an interruption-signal outputted from the system control circuit 32 to the sensor control circuit 76.

At step 401, as soon as a given interruption-signal is outputted from the system control circuit 32 to the sensor control circuit 76, an input of further interruption-signals to the sensor control circuit 76 is disabled. Namely, since the system control circuit 32 has a common output port for outputting interruption-signals to various control circuits included in the camera, the sensor control circuit 76 must be protected from the input of other interruption-signals after the necessary interruption-signal is once inputted from the system control circuit 32 to the sensor control circuit 76.

At step 402, the positional data [PD] and the angular data [AD] are read from the data-memory 78, and are fed from the sensor control circuit 76 to the system control circuit 32.

At step 403, an input of an interruption-signal to the sensor control circuit 76 is enabled, and thus the sensor control circuit 76 is able to receive an output of an interruption-signal from the system control circuit 32 during a next photographing operation.

Figure 5:
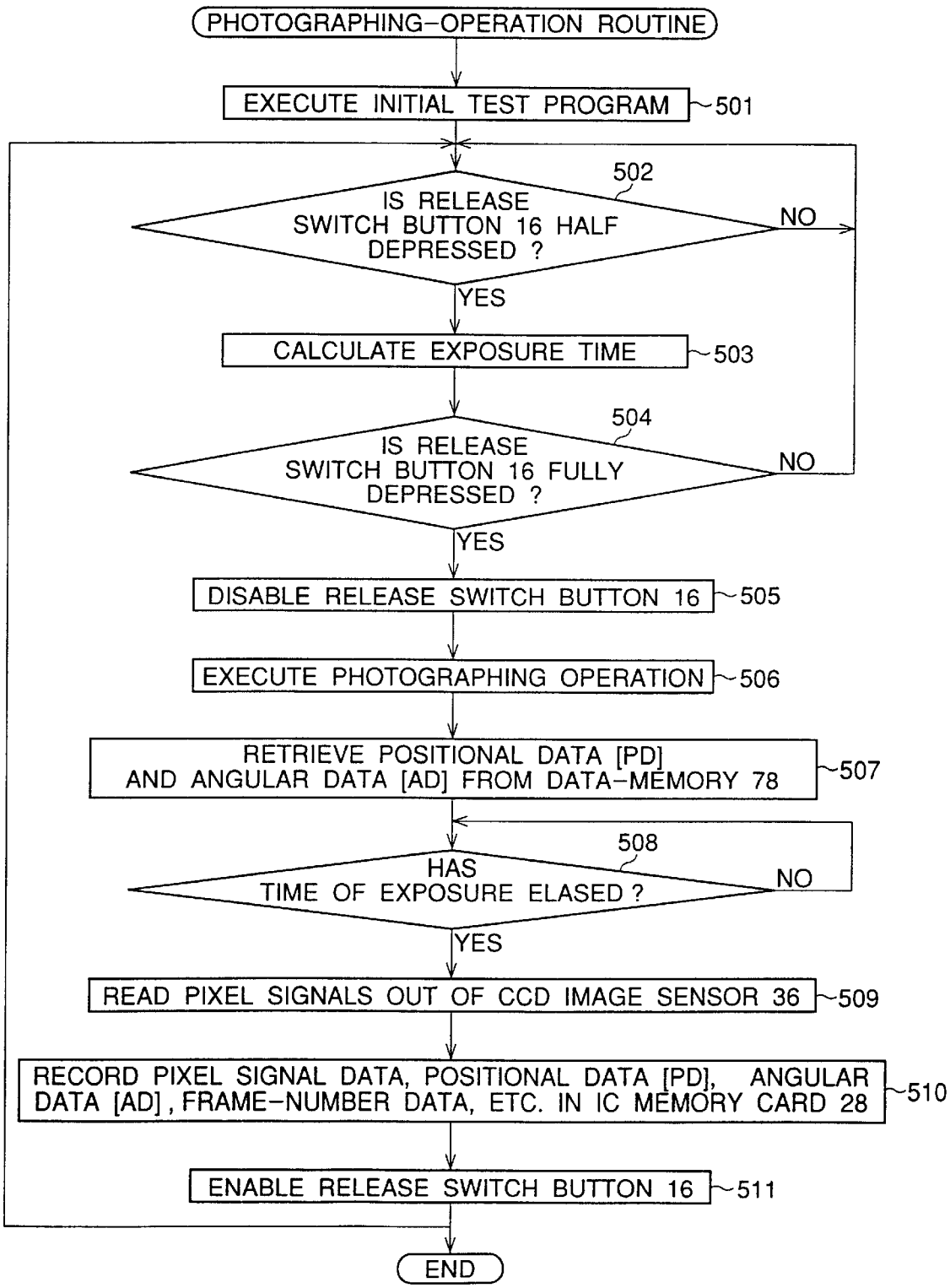
FIG. 5 is a flowchart of a photographing-operation routine, executed by the electronic still video camera shown in FIGS. 1 and 2.

FIG. 5 shows a flowchart for a photographing-operation routine, executed in the system control circuit 32, being also initiated by depressing the power switch button 24 which turns ON the power switch 80.

At step 501, an initial test program is executed to determine whether or not various functions of the camera can be properly performed. If any one of the functions of the camera is improper, a message, warning that the camera operation is irregular, is displayed on the LCD panel 20.

At step 502, it is determined whether or not the release switch button 16 is half depressed, thereby turning ON the photometry-sensor switch 82. The determination of half-depression of the release switch button 16 is repeatedly executed at time-intervals of, for example, 1 ms.

When it is confirmed that the release switch button 16 is half depressed, the control proceeds to step 503, in which a time of exposure or a time of electric charge accumulation is determined based upon an output signal of the photometry sensor 46.

Then, at step 504, it is determined whether or not the release switch button 16 is fully depressed. Unless the release switch button 16 is fully depressed after being half-depressed, the control returns from step 504 to step 502. Note, the determination of full-depression of the release switch button 16 is also repeatedly executed at time-intervals of, for example, 1 ms.

When it is confirmed that the release switch button 16 is fully depressed, thereby turning ON the release switch 84, the control proceeds from step 504 to step 505, in which the release switch button 16 is disabled.

At step 506, a photographing operation is executed. In particular, an aperture size of the diaphragm 34 is adjusted by the iris driver circuit, under control of the exposure control circuit 44, based upon the output signal of the photometry sensor 46. The quick return mirror 38 is then subsequently rotated upward from the down-position to the up-position. Thus, the light-receiving area of the CCD area image sensor 36 is exposed to light beams passing through the photographing optical system 12. Namely, an optical image, photographed by the photographing optical system 12, is focused and formed on the light receiving area of the CCD area image sensor 36, whereby the optical image is converted into a frame of electrical pixel-signals.

At step 507, the positional data [PD] and the angular data [AD] are retrieved from the data-memory 78 via the sensor control circuit 76. Namely, the system control circuit 32 outputs an interruption-signal, so that the positional data [PD] and the angular data [AD] are fed to the sensor control circuit 76, as mentioned above.

At step 508, it is determined whether or not a given time of exposure (i.e. a time of electric charge accumulation) for converting the optical image into electrical pixel signals, by the CCD area image sensor 36 has elapsed. As soon as the time of exposure, has elapsed, the quick return mirror 38 is returned from the up-position to the down-position.

At step 509, the frame of pixel signals are read out of the image sensor 36, are amplified by the amplifier 50, are converted to digital pixel signals by the A/D converter 52, and are processed by the image processing circuit 54, before being temporarily stored in the memory 56.

At step 510, the pixel signals are outputted from the memory 56 to the memory-card driver circuit 58, by which the outputted pixel signals are stored as a frame of pixel data in the IC memory card 28. At this time, the positional data [PD] and the angular data [AD] are also stored, along with frame-number data and other information data, in the IC memory-card 28.

Figure 6:
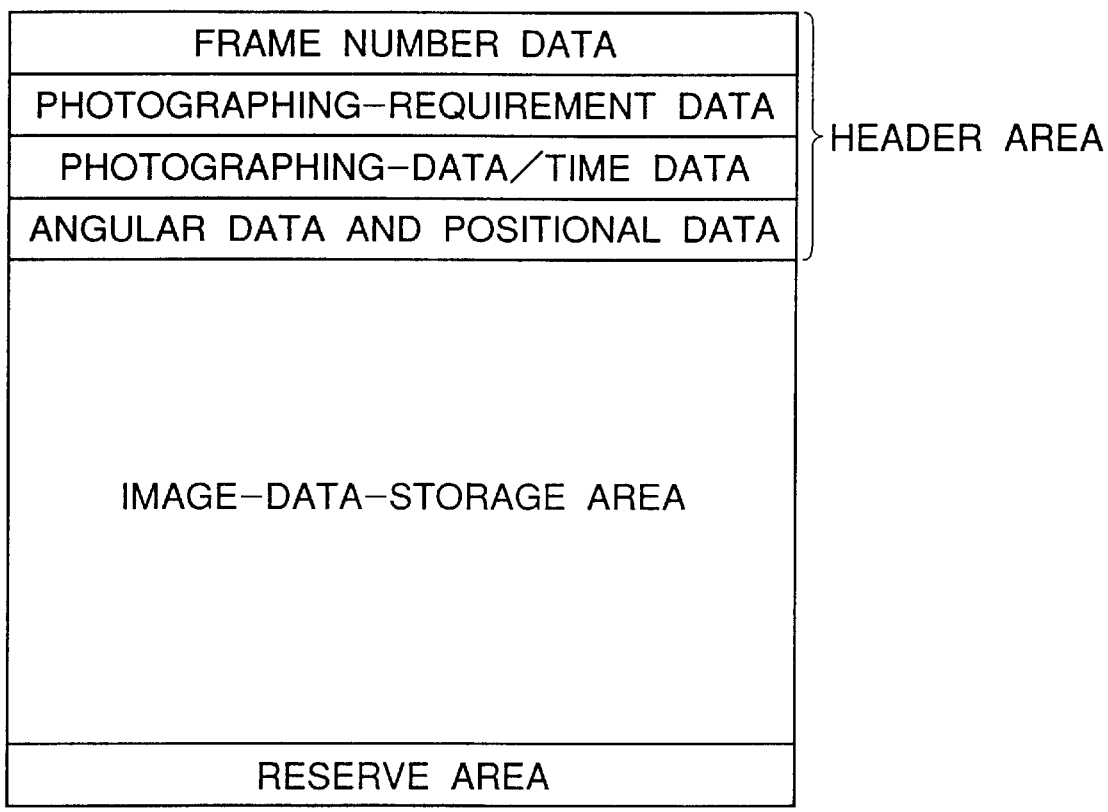
FIG. 6 is a conceptual schematic view showing an example of a format of an IC memory card, which can be loaded in the electronic still video camera shown in FIGS. 1 and 2.

As conceptually shown in FIG. 6, a memory area of the IC memory card 28 is formatted so as to be divided into a header area and an image-data-storage area. The frame of pixel data is stored in the image-data-storage area, and the positional data [PD], the angular data [AD], the frame-number data and other information data, such as photographing-requirement data, photographing-date/time data and so on, are stored in the header area. Also, as shown in FIG. 6, the memory area of the IC memory card 28 may include a reserve area.

After the pixel data, the positional data [PD], the angular data [AD], the frame-number data and other information data are stored in the IC memory card 28, the control proceeds to step 511, in which the release switch button 16 is enabled. Thereafter, the control returns to step 502, and is ready for a next photographing operation.

Figure 7:
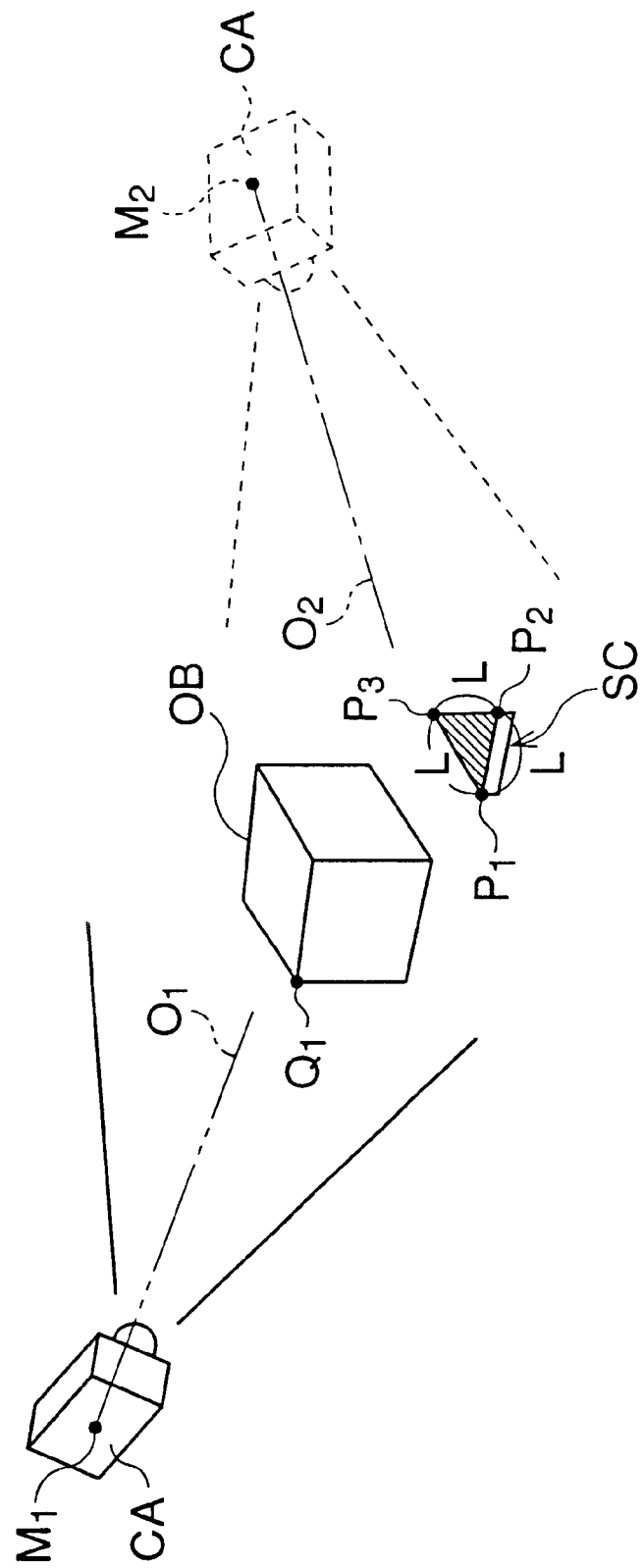
FIG. 7 is a conceptual perspective view showing a photogrammetric measurement system using the electronic still video camera of FIGS. 1 and 2.

FIG. 7 conceptually shows a photogrammetric measurement system, using the camera constructed according to the present invention. In this drawing, a cubic object OB is situated at a spot to be photogrammetrically measured, and a standard measurement scale SC is placed beside the cubic object OB. The standard measurement scale SC and the cubic object OB are photographed in two different directions by the camera, indicated by reference CA. Namely, as shown in FIG. 7, the standard scale SC and the cubic object OB are photographed by the camera CA placed at a first photographing position $M_1$, shown by a solid line, and are then photographed by the camera CA placed at a second photographing position $M_2$, shown by a broken line. At the first photographing position $M_1$, an optical axis of the camera CA is indicated by reference $O_1$, and, at the second photographing position $M_2$, the optical axis of the camera CA is indicated by reference $O_2$.

Note, each of the first and second photographing positions $M_1$ and $M_2$ may be defined as a back principal point of the photographing optical system 12 of the camera CA.

In the example shown in FIG. 7, the standard measurement scale SC is shaped as an equilateral-triangular plate member, and has three reference points $P_1$, $P_2$ and $P_3$ positioned in the vicinity of the apexes of the equilateral-triangular plate member, such that an equilateral triangle is defined by the reference points $P_1$, $P_2$ and $P_3$, as shown by a hatched area in FIG. 7. The hatched area is utilized as a reference plane, and the sides of the equilateral triangle, defined by the reference points $P_1$, $P_2$ and $P_3$, have a predetermined length of L, which is utilized as a standard measurement length.

Note, of course, three respective cone-shaped markers, which are identical to each other, may be positioned at suitable locations, in place of the standard measurement scale SC. In this case, a distance between two apexes of the cone-shaped markers is previously measured, for example, with a measuring tape, and is set as the standard measurement length. Also, a plane, defined by the three apexes of the cone-shaped markers, is utilized as the reference plane.

Figure 8:
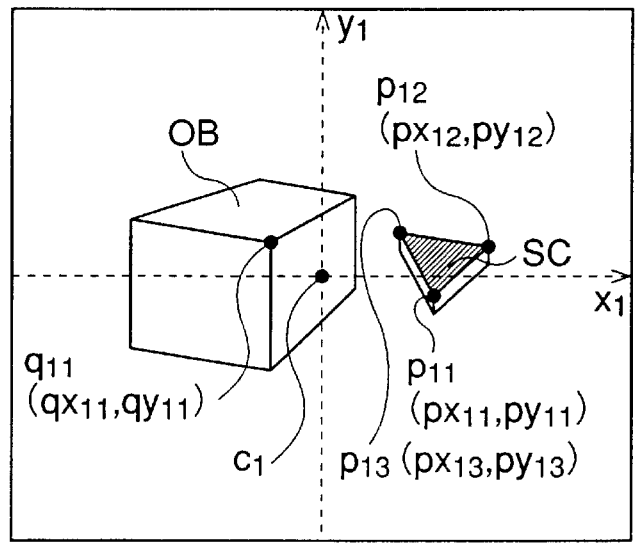
FIG. 8 is a conceptual view showing a picture photographed at a first photographing position in the measurement system of FIG. 7.

FIG. 8 shows a first picture photographed by the camera CA at the first photographing position $M_1$. As is apparent from this drawing, a rectangular $x_1$-$y_1$ coordinate system is defined on the first picture, and an origin $c_1$ of the $x_1$-$y_1$ coordinate system is at the photographed center of the first picture. In this coordinate system, the reference points $P_1$, $P_2$ and $P_3$ are represented by coordinates $p_{11}(px_{11}, py_{11})$, $p_{12}(px_{12}, py_{12})$ and $p_{13}(px_{13}, py_{13})$, respectively.

Figure 9:
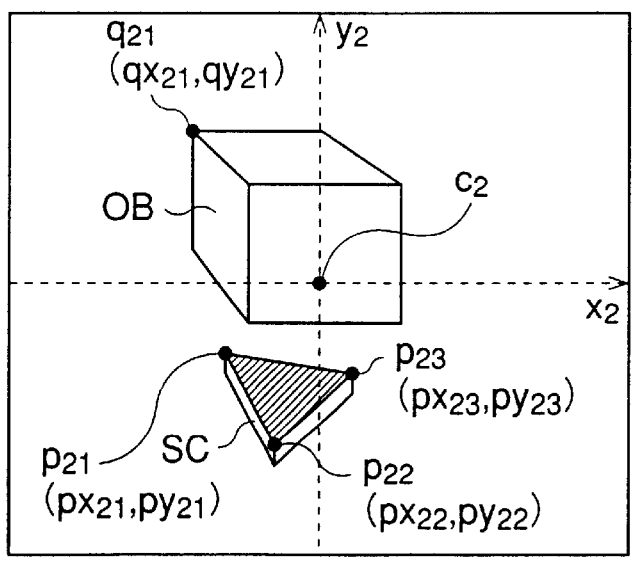
FIG. 9 is a conceptual view showing another picture photographed at a second photographing position in the measurement system of FIG. 7.

FIG. 9 shows a second picture photographed by the camera CA at the second photographing position $M_2$. As is apparent from this drawing, a rectangular $x_2$-$y_2$ coordinate system is defined on the second picture, and an origin $c_2$ of the $x_2$-$y_2$ coordinate system is at the photographed center of the second picture. In this coordinate system, the reference points $P_1$, $P_2$ and $P_3$ are represented by coordinates $p_{21}(px_{21}, py_{21})$, $p_{22}(px_{22}, py_{22})$ and $p_{23}(px_{23}, py_{23})$, respectively.

Figure 10:
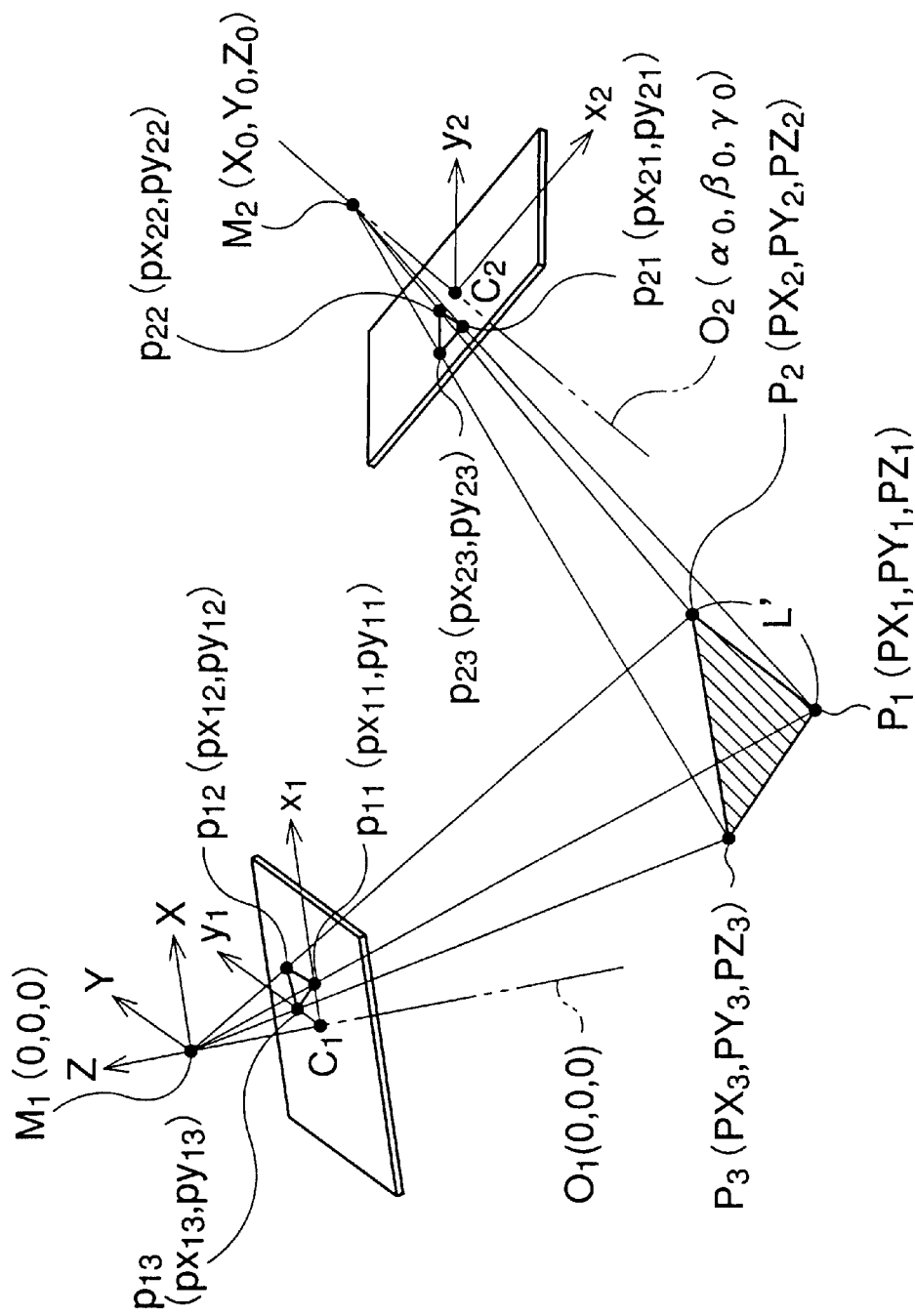
FIG. 10 is a conceptual view showing a relative-positional relationship between the standard scale and the first and second pictures from FIGS. 8 and 9, respectively.

FIG. 10 shows a relative-positional three-dimensional relationship between the standard scale SC, the camera CA, and the first and second pictures. In this case, the standard scale SC is relatively reproduced on the basis of the first and second pictures placed at the first and second photographing positions $M_1$ and $M_2$, but a size of the standard scale SC is also relative. Thus, a length of the sides of the equilateral triangle, defined by the reference points $P_1$, $P_2$ and $P_3$, is indicated by L'.

In order to calculate three-dimensional coordinates of the cubic object OB, it is necessary to define an X-Y-Z three-dimensional coordinate system, as shown in FIG. 10, and the reference points $P_1$, $P_2$ and $P_3$ of the standard scale SC, recorded on each of the first and second pictures, must be positionally determined with respect to this second three-dimensional coordinate system.

As shown in FIG. 10, an origin of the X-Y-Z three-dimensional coordinate system is at the first photographing position $M_1$. Namely, the first photographing position $M_1$ is represented by the origin coordinates (0, 0, 0) of the X-Y-Z three-dimensional coordinate system. Also, a Z-axis of the X-Y-Z three-dimensional coordinate system coincides with the optical axis $O_1$ of the camera CA, placed at the first photographing position $M_1$, represented by angular coordinates (0, 0, 0). The second photographing position $M_2$ is represented by coordinates ($X_0$, $Y_0$, $Z_0$), and the optical axis $O_2$ of the camera CA, placed at the second photographing position $M_2$, is represented by angular coordinates ($\alpha_0$, $\beta_0$, $\gamma_0$). Namely, the optical axis $O_2$ of the camera CA defines angles of $\alpha_0$, $\beta_0$ and $\gamma_0$ with the X-axis, Y-axis and Z-axis of the X-Y-Z three-dimensional coordinate system, respectively.

The reference points $P_1$, $P_2$ and $P_3$ of the standard scale SC are represented by three-dimensional coordinates $P_j(PX_j, PY_j, PZ_j)$ (j=1, 2, 3). As shown in FIG. 10, each of the reference points [$P_1(PX_1, PY_1, PZ_1)$, $P_2(PX_2, PY_2, PZ_2)$ and $P_3(PX_3, PY_3, PZ_3)$], the image point [$p_{11}(px_{11}, py_{11})$, $p_{12}(px_{12}, py_{12})$, $p_{13}(px_{13}, py_{13})$] of the corresponding reference point recorded on the first picture, and the back principal point ($M_1$) of the camera CA, are aligned with each other on a straight axis. Similarly, each of the reference points [$P_1(PX_1, PY_1, PZ_1)$, $P_2(PX_2, PY_2, PZ_2)$ and $P_3(PX_3, PY_3, PZ_3)$], the image point [$p_{21}(px_{21}, py_{21})$, $p_{22}(px_{22}, py_{22})$, $p_{23}(px_{23}, py_{23})$] of the corresponding reference point recorded on the second picture, and the back principal point ($M_2$) of the camera CA, are aligned with each other on a straight axis.

Accordingly, the three-dimensional coordinates $P_j(PX_j, PY_j, PZ_j)$ can be determined by the following collinear equations:

$$PX_j = (PZ_j - Z_0)\frac{a_{11}px_{ij} + a_{21}py_{ij} - a_{31}C}{a_{13}px_{ij} + a_{23}py_{ij} - a_{33}C} + X_0$$

$$PY_j = (PZ_j - Z_0)\frac{a_{12}px_{ij} + a_{22}py_{ij} - a_{32}C}{a_{13}px_{ij} + a_{23}py_{ij} - a_{33}C} + Y_0$$

(i = 1, 2; j = 1, 2, 3)

Herein:

$a_{11}$=cos $\beta$*sin $\gamma$
$a_{12}$=-cos $\beta$*sin $\gamma$
$a_{13}$=sin $\beta$
$a_{21}$=cos $\alpha$*sin $\gamma$+sin $\alpha$*sin $\beta$*cos $\gamma$
$a_{22}$=cos $\alpha$*cos $\gamma$+sin $\alpha$*sin $\beta$*sin $\gamma$
$a_{23}$=-sin $\alpha$*sin $\beta$
$a_{31}$=sin $\alpha$*sin $\gamma$+cos $\alpha$*sin $\beta$*cos $\gamma$
$a_{32}$=sin $\alpha$*cos $\gamma$+cos $\alpha$*sin $\beta$*sin $\gamma$
$a_{33}$=cos $\alpha$*cos $\gamma$ Note that, in these equations, C indicates a principal focal length of the camera CA, which is defined as a distance between the back principal point ($M_1$) and the photographing center ($c_1$) of the first picture, and a distance between the back principal point ($M_2$) and the photographing center ($c_2$) of the second picture. Also note, i corresponds to a number of the pictures; and j corresponds to a number of the reference points $P_1$, $P_2$ and $P_3$ of the standard scale SC.

As already mentioned above, when the first picture has been photographed by the camera CA at the first photographing position $M_1$, image-pixel data of the first picture is stored, together with the positional data [PD], the angular data [AD], the frame-number data and other information data, in the IC memory card 28. In this case, the positional data [PD], derived from the $\chi$-$\psi$-$\omega$ three-dimensional coordinate system, may be represented by three-dimensional coordinates ($X_1$, $Y_1$, $Z_1$), and the angular data [AD], also derived from the $\chi$-$\psi$-$\omega$ three-dimensional coordinate system, may be represented by three-dimensional angular coordinates ($\alpha_1$, $\beta_1$, $\gamma_1$).

Similarly, when the second picture has been photographed by the camera CA at the second photographing position $M_2$, image-pixel data of the second picture is stored, together with the angular data, the positional data, the frame-number data and other information data, in the IC memory card 28. In this case, the positional data [PD], derived from the $\chi$-$\psi$-$\omega$ three-dimensional coordinate system, may be represented by three-dimensional coordinates ($X_2$, $Y_2$, $Z_2$), and the angular data [AD], also derived from the $\chi$-$\psi$-$\omega$ three-dimensional coordinate system, may be represented by three-dimensional angular coordinates ($\alpha_2$, $\beta_2$, $\gamma_2$).

Figure 11:
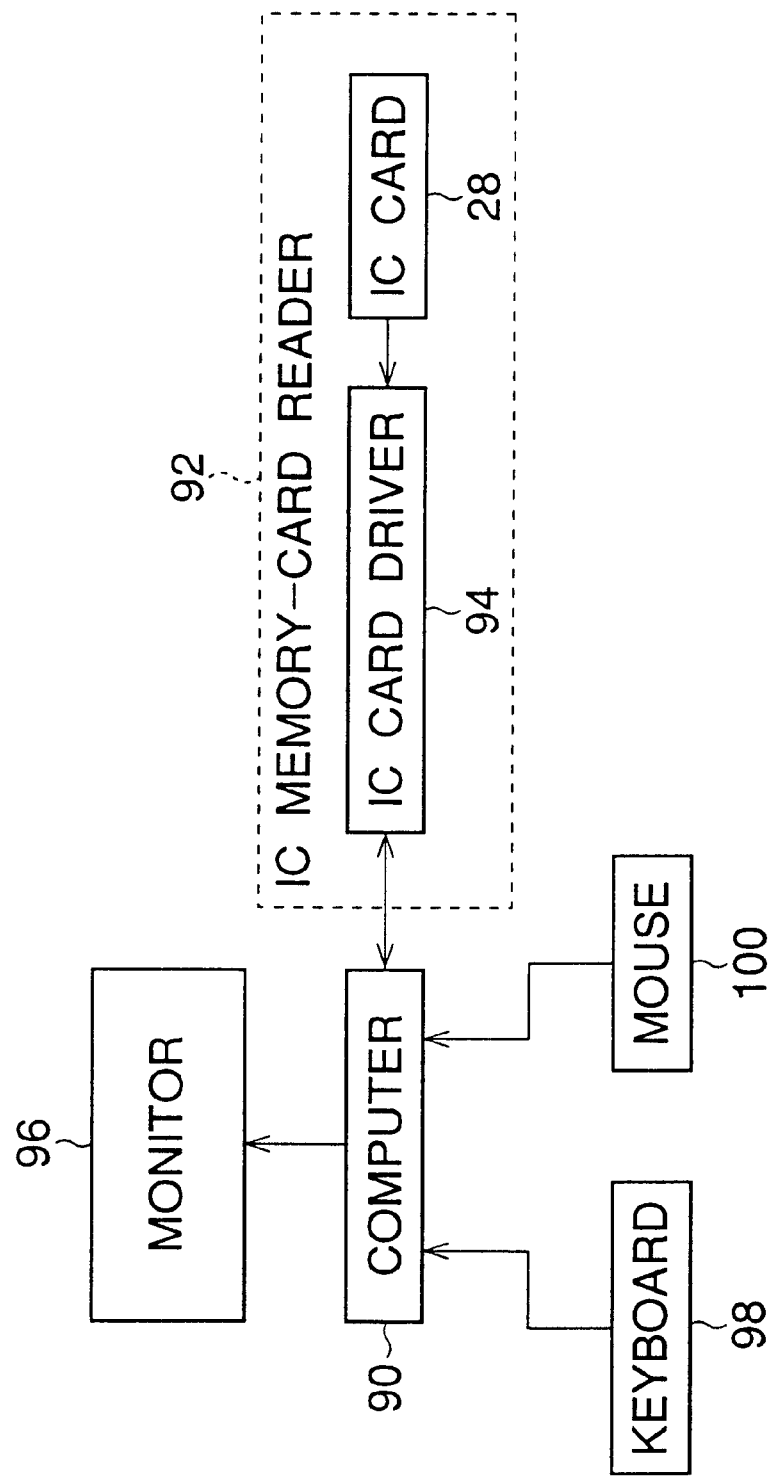
FIG. 11 is a block diagram of a computer system, in which a photogrammetric measurement is performed, according to the present invention.

FIG. 11 shows a block diagram of a computer system, in which the photogrammetric measurement, as mentioned above, is performed on the basis of the image-pixel data, the angular data and the positional data stored in the IC memory card 28.

As shown in FIG. 11, the computer system comprises a computer 90 having a photogrammetric measurement program installed therein, and an IC memory card reader 92 connected to the computer 90. The IC memory card reader 92 is provided with a slot for receiving the IC memory card 28, and includes an IC card driver 94 for reading a given frame of image-pixel data, angular data, positional data and other information data. The computer system further comprises a monitor 96 for reproducing a photographed picture based on the frame of image-pixel data read from the IC memory card 28, a keyboard 98 for inputting various command signals and various data to the computer 90, and a mouse 100 for manipulating a cursor displayed on the monitor 96.

Figure 12:
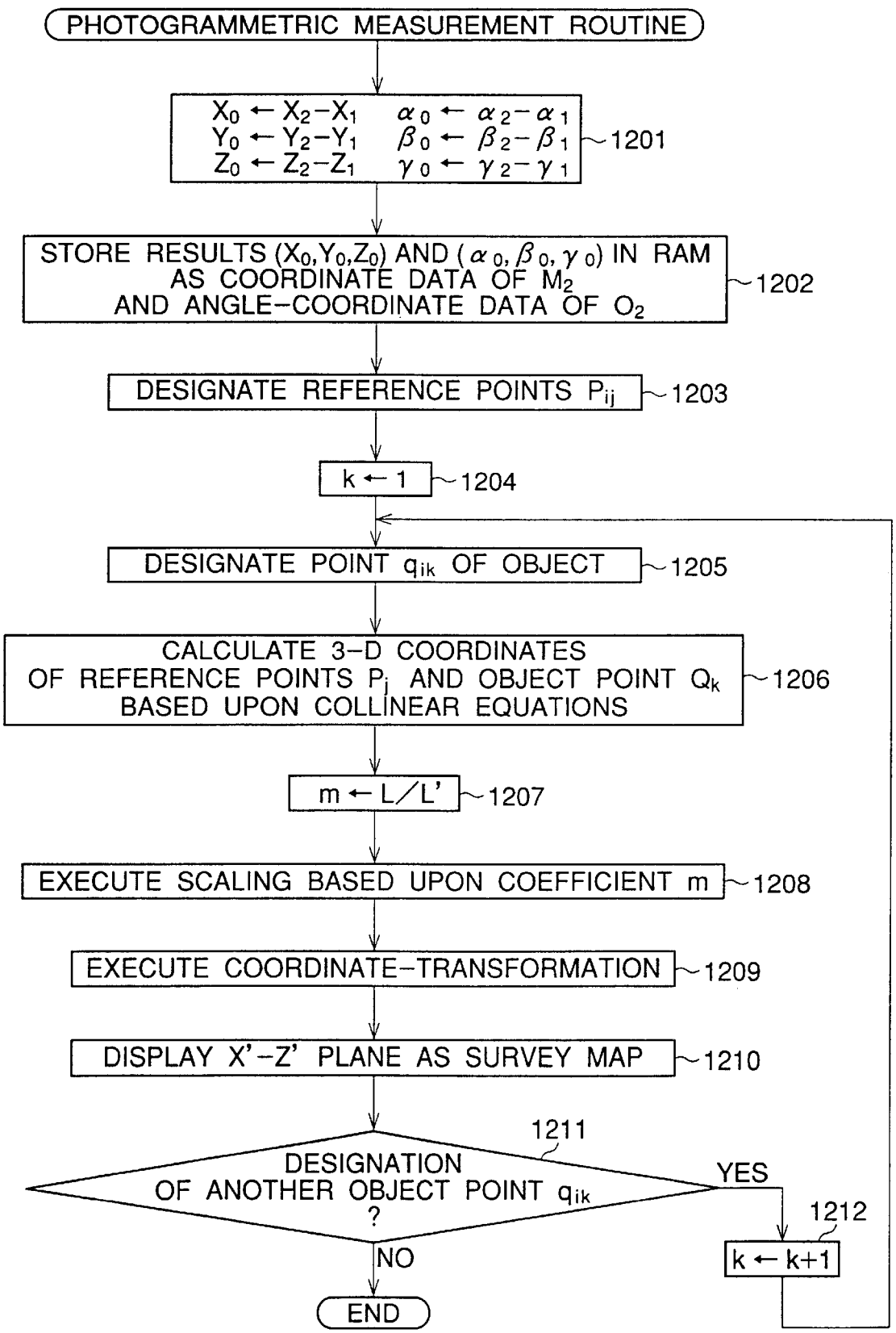
FIG. 12 is a flowchart of a photogrammetric measurement routine for producing a survey map on the basis of the first and second pictures shown in FIGS. 8 and 9.

FIG. 12 shows a flowchart of a photogrammetric measurement routine, executed in the computer 90 shown in FIG. 11, in which a survey map is developed based upon the first and second pictures, shown in FIGS. 8 and 9. Before the execution of the routine, a set of frame numbers, corresponding to the first and second pictures, is selected by inputting a set of frame-number data via the keyboard 98, and thus two frames of image-pixel data, corresponding to the first and second pictures, are read from the IC memory card 28, so that the first and second pictures are simultaneously reproduced and displayed on the monitor 96, as shown in FIGS. 8 and 9.

At step 1201, on the basis of both the positional data coordinates ($X_1$, $Y_1$, $Z_1$) and angular data coordinates ($\alpha_1$, $\beta_1$, $\gamma_1$) of the camera, derived from the $\chi$-$\psi$-$\omega$ three-dimensional coordinate system and obtained at the first photographing position $M_1$, and the positional data coordinates ($X_2$, $Y_2$, $Z_2$) and angular data coordinates ($\alpha_2$, $\beta_2$, $\gamma_2$) of the camera, derived from the $\chi$-$\psi$-$\omega$ three-dimensional coordinate system and obtained at the second photographing position $M_2$, the following calculations are executed:

$X_0 \leftarrow X_2 - X_1$
$Y_0 \leftarrow Y_2 - Y_1$
$Z_0 \leftarrow Z_2 - Z_1$ $$\alpha_0 \leftarrow \alpha_2 - \alpha_1$$

$$\beta_0 \leftarrow \beta_2 - \beta_1$$

$$\gamma_0 \leftarrow \gamma_2 - \gamma_1$$

Namely, assuming that the first photographing position $M_1$ is situated at the origin of the X-Y-Z three-dimensional coordinate system, and that the optical axis $O_1$ of the camera coincides with the Z-axis of the X-Y-Z three-dimensional coordinate system (FIG. 10), the three-dimensional coordinates $(X_0, Y_0, Z_0)$ of the second photographing position $M_2$ and the angular coordinates $(\alpha_0, \beta_0, \gamma_0)$ of the optical axis $O_2$ of the camera are calculated, based on the values derived from the $\chi$-$\psi$-$\omega$ three-dimensional coordinate system.

At step 1202, the calculated results, i.e. the three-dimensional coordinate data $(X_0, Y_0, Z_0)$ of the photographing position $M_2$ and the angular coordinate data $(\alpha_0, \beta_0, \gamma_0)$ of the optical axis $O_2$ are temporarily stored in a RAM of the computer 90. Then, at step 1203, the respective reference points $p_{ij}(px_{ij}, py_{ij})$ are successively designated, on the first and second pictures displayed on the monitor 96, with the cursor manipulated by the mouse 100. Namely, the two sets of coordinates $p_{11}(px_{11}, py_{11})$ and $p_{21}(px_{21}, py_{21})$, the two sets of coordinates $p_{12}(px_{12}, py_{12})$ and $p_{22}(px_{22}, py_{22})$, and the two sets of coordinates $p_{13}(px_{13}, py_{13})$ and $p_{23}(px_{23}, py_{23})$ are also temporarily stored in the RAM of the computer 90.

After the designation of the points $p_{ij}(px_{ij}, py_{ij})$, at step 1204, a counter k is set to 1. Then, at step 1205, a suitable point $Q_{1(k=1)}$ of the cubic object OB is selected (FIG. 7), and image points $q_{ik}$ (FIGS. 8 and 9) of the selected point $Q_1$, displayed on the first and second pictures of the monitor 96, are designated with the cursor manipulated by the mouse 100. Namely, the two sets of coordinates $q_{11}(qx_{11}, qy_{11})$ and $q_{21}(qx_{21}, qy_{21})$ of the image point $Q_1$ are temporarily stored in the RAM of the computer 90.

At step 1206, the above-mentioned collinear equations are solved on the basis of the coordinate data stored in the RAM, and the three-dimensional coordinates $P_j(PX_j, PY_j, PZ_j)$ of the reference points $P_1$, $P_2$ and $P_3$, and the three-dimensional coordinates $Q_1(QX_1, QY_1, QZ_1)$ of the object point $Q_1$ are determined.

At step 1207, a coefficient m is calculated as follows:

$$m \leftarrow L/L'$$

Note, L is the actual length between the reference points $P_1$, $P_2$ and $P_3$, and L' is the relative length obtained from the determined three-dimensional coordinates $P_j(PX_j, PY_j, PZ_j)$.

At step 1208, scaling is executed, using the coefficient m, between the determined three-dimensional coordinates $P_j(PX_j, PY_j, PZ_j)$ and $Q_1(QX_1, QY_1, QZ_1)$, so as to obtain an accurate spatial relationship therebetween. Then, at step 1209, the X-Y-Z three-dimensional coordinate system is transformed into an X'-Y'-Z' three-dimensional coordinate system, defined as shown in FIG. 13.

Figure 13:
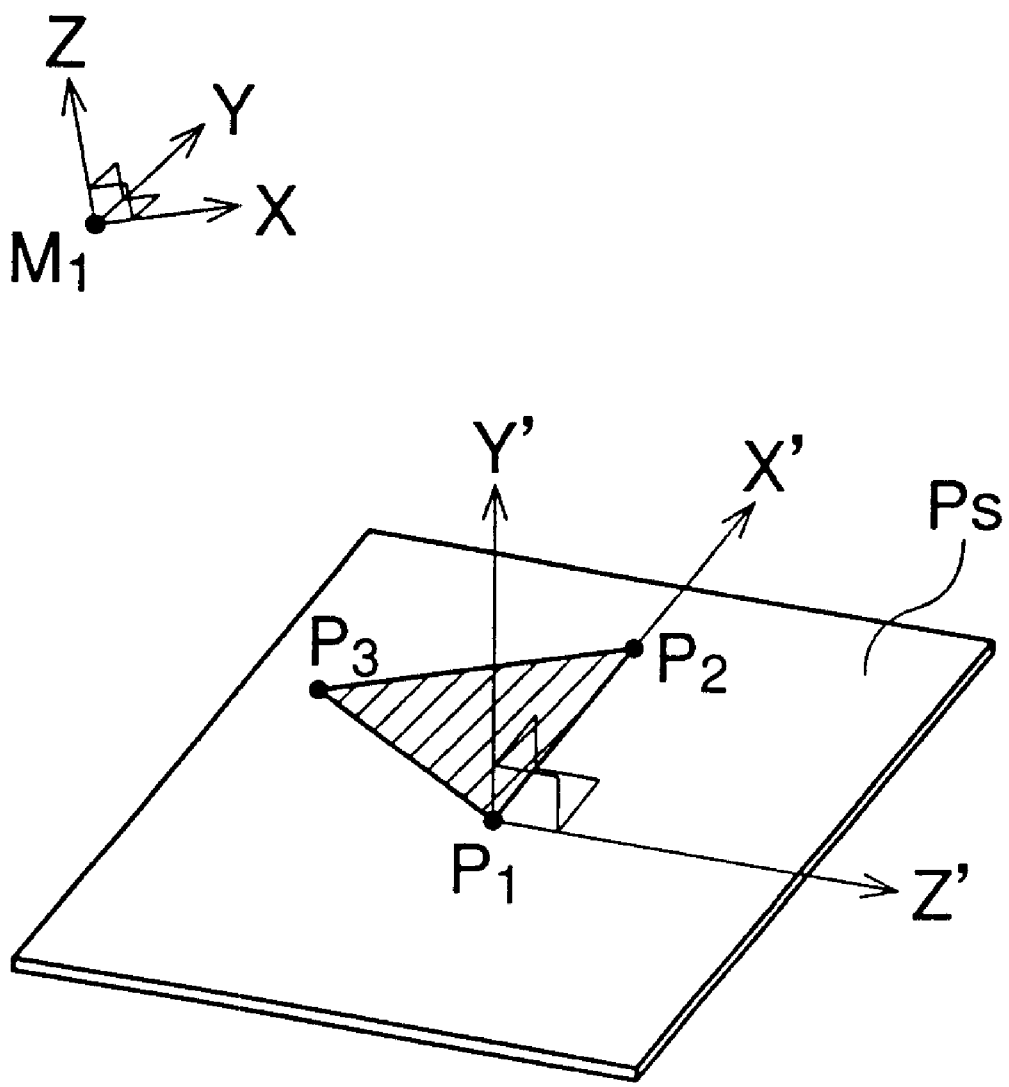
FIG. 13 is a conceptual perspective view showing a three-dimensional coordinate system for producing the survey map.

As is apparent from FIG. 13, an origin of the X'-Y'-Z' three-dimensional coordinate system is at the reference point $P_1$, and the X'-axis thereof is defined by the reference points $P_1$ and $P_2$. Also, The X'- and Z'-axes of the coordinate system define a plane Ps, which includes the hatched triangular plane area or reference area defined by the reference points $P_1$, $P_2$ and $P_3$. In the example of FIG. 13, although the origin of the X'-Y'-Z' three-dimensional coordinate system coincides with the reference point $P_1$, the origin may be at any location included in the plane Ps.

At step 1210, the X'-Z' plane Ps, on which the reference points $P_1$, $P_2$ and $P_3$ and the object point $Q_1$ are recorded, is displayed as a survey map on the monitor 96. Then, at step 1211, it is determined whether or not another set of points $q_{1k}$ and $q_{2k}$ should be designated with respect to the cubic object OB. When the other set of points $q_{1k}$ and $q_{2k}$ should be further designated, i.e. when an insufficient number of sets of points $q_{1k}$ and $q_{2k}$, which are necessary to produce an acceptable survey map, have been designated, the control proceeds from step 1211 to step 1212, in which the counter k is incremented by 1. Thereafter, the routine comprising steps 1205 to 1210 is again executed.

At step 1211, when a further set of points $q_{1k}$ and $q_{2k}$ need not be designated, i.e. when sufficient sets of $q_{1k}$ and $q_{2k}$, which are necessary to produce an acceptable survey map, have been designated, the routine is completed.

Figure 14:
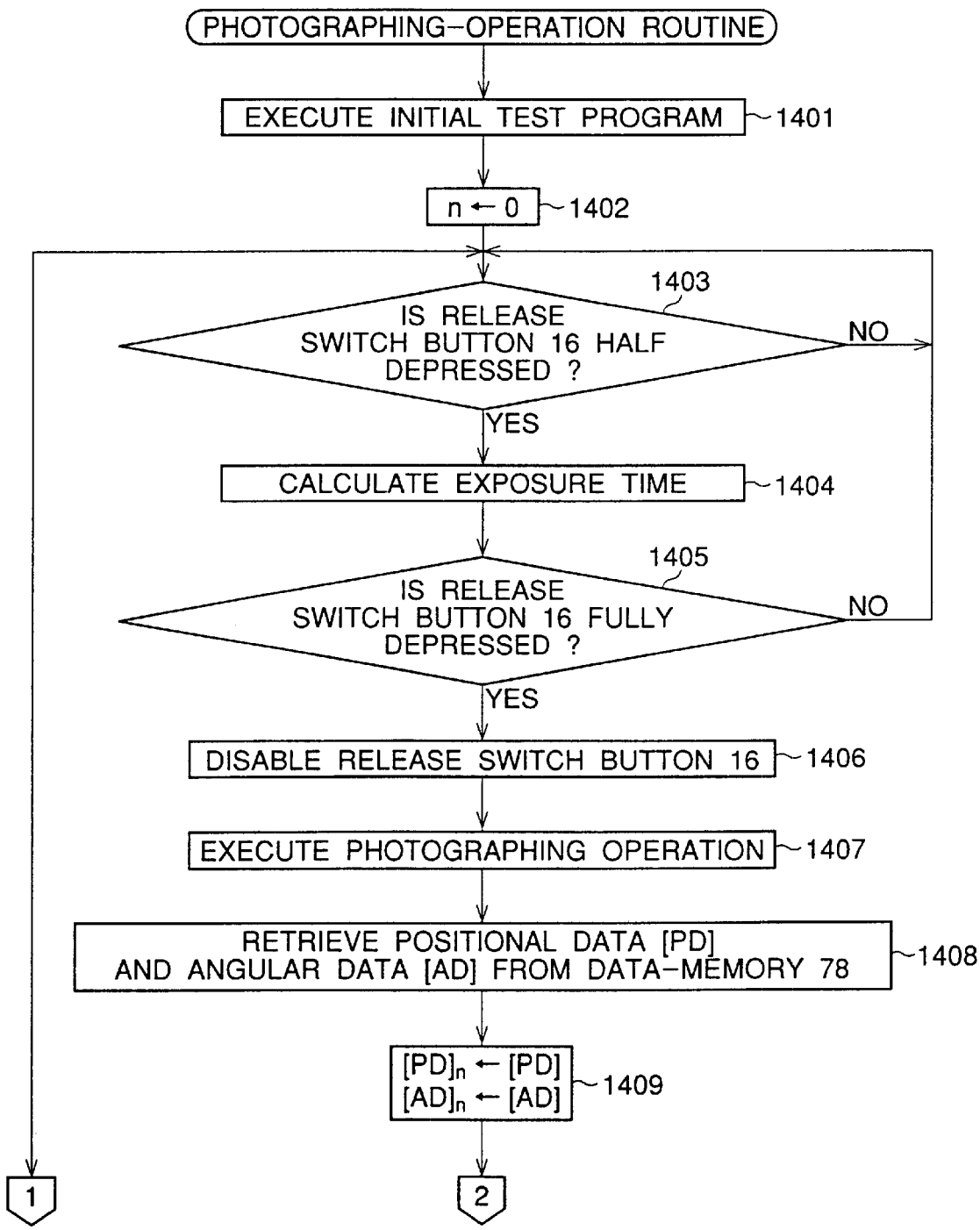
FIG. 14 is a flowchart showing a part of a modification of the photographing-operation routine shown in FIG. 5;.
Figure 15:
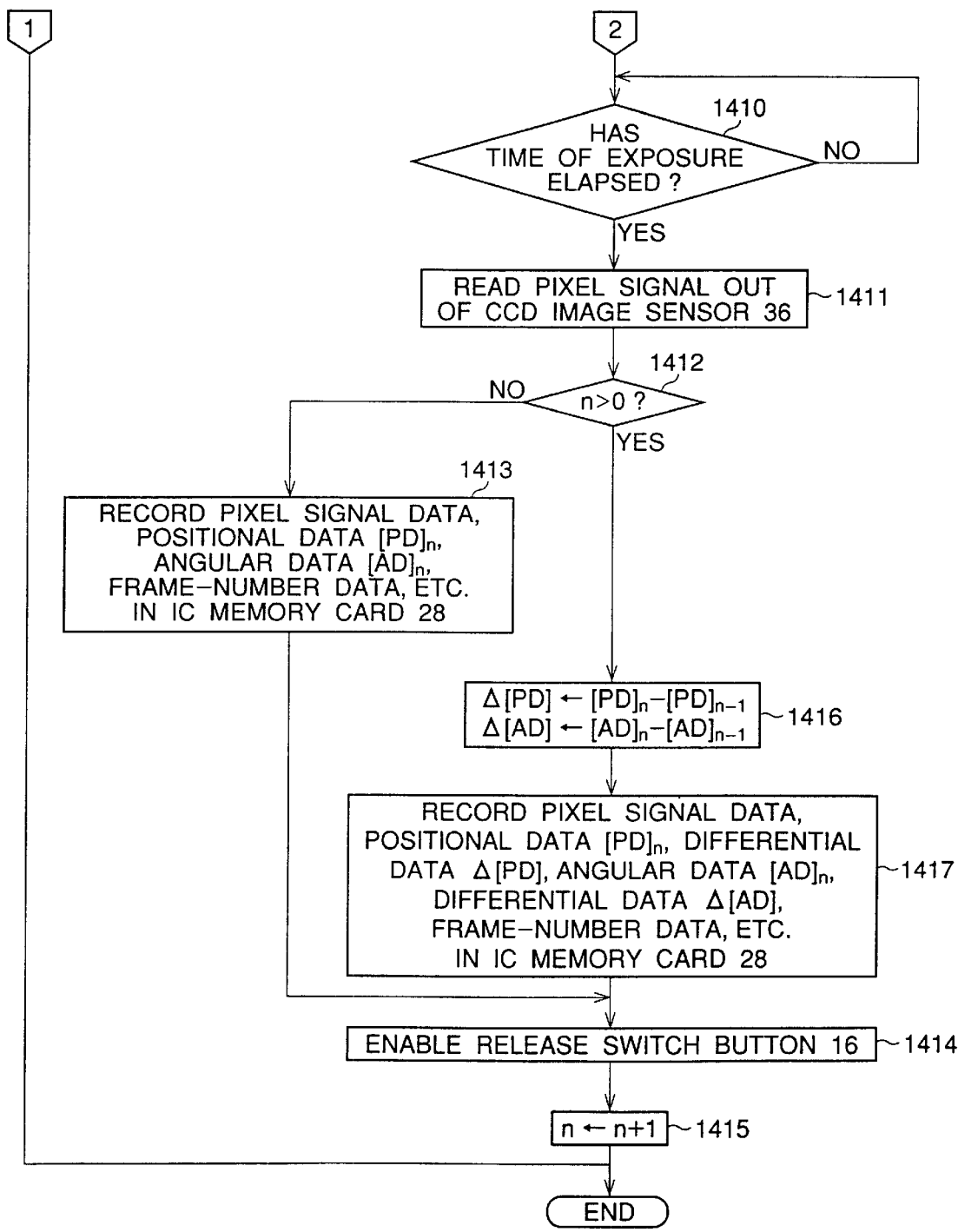
FIG. 15 is a flowchart showing the remaining part of the modification of the photographing-operation routine shown in FIG. 5.

FIGS. 14 and 15 show a flowchart for another photographing-operation routine, executed in the system control circuit 32. Note, an execution of this routine is also initiated by depressing the power switch button 24 which turns ON the power switch 80.

At step 1401, an initial test program is executed to determine whether or not various functions of the camera can be properly performed. If any one of the functions of the camera is improper, a message, warning that the camera operation is irregular, is displayed on the LCD panel 20.

At step 1402, a counter n is reset. Then at step 1403, it is determined whether or not the release switch button 16 is half depressed, thereby turning ON the photometry-sensor switch 82. The determination of half-depression of the release switch button 16 is repeatedly executed at time-intervals of, for example, 1 ms.

When it is confirmed that the release switch button 16 is half depressed, the control proceeds to step 1404, in which a time of exposure or a time of electric charge accumulation is determined based upon an output signal of the photometry sensor 46.

Then, at step 1405, it is determined whether or not the release switch button 16 is fully depressed. Unless the release switch button 16 is fully depressed after being half-depressed, the control returns from step 1405 to step 1403. Note, the determination of full-depression of the release switch button 16 is also repeatedly executed at time-intervals of, for example, 1 ms.

When it is confirmed that the release switch button 16 is fully depressed, thereby turning ON the release switch 84, the control proceeds from step 1405 to step 1406, in which the release switch button 16 is disabled.

At step 1407, a photographing operation is executed. In particular, an aperture size of the diaphragm 34 is adjusted by the iris driver circuit, under control of the exposure control circuit 44, based upon the output signal of the photometry sensor 46. The quick return mirror 38 is then subsequently rotated upward from the down-position to the up-position. Thus, the light-receiving area of the CCD area image sensor 36 is exposed to light beams passing through the photographing optical system 12. Namely, an optical image, photographed by the photographing optical system 12, is focused and formed on the light receiving area of the CCD area image sensor 36, whereby the optical image is converted into a frame of electrical pixel signals.

At step 1408, the positional data [PD] and the angular data [AD] are retrieved from the data-memory 78 via the sensor control circuit 76. Namely, as already stated, the system control circuit 32 outputs the interruption-signal, so that the positional data [PD] and the angular data [AD] are fed to the sensor control circuit 76. Then, at step 1409, the positional data [PD] are made to $[PD]_n$, and the angular data [AD] are made to $[AD]_n$.

At step 1410, it is determined whether or not a given time of exposure (i.e. a time of electric charge accumulation) for converting the optical image into electrical pixel signals by the CCD area image sensor 36 has elapsed. As soon as the time of exposure has elapsed, the quick return mirror 38 is returned from the up-position to the down-position.

At step 1411, the frame of pixel signals are read out of the image sensor 36, are amplified by the amplifier 50, are converted to digital pixel signals by the A/D converter 52, and are processed by the image processing circuit 54, before being temporarily stored in the memory 56.

At step 1412, it is determined whether or not a count number of the counter n exceeds a numerical value of zero. At this stage, since n=0 (step 1402), the control proceeds to step 1413, in which the pixel signals are outputted from the memory 56 to the memory-card driver circuit 58, by which the outputted pixel signals are stored as a frame of pixel data in the IC memory card 28. At this time, the positional data $[PD]_n$ and the angular data $[AD]_n$ are also stored, along with frame-number data and other information data, in the IC memory-card 28. As shown in FIG. 6, the frame of pixel data is stored in the image-data-storage area of the IC memory card 28, and the positional data $[PD]_n$, the angular data $[AD]_n$, the frame-number data and other information data are stored in the header area of the IC memory card 28.

After the pixel data, the positional data $[PD]_n$, the angular data $[AD]_n$, the frame-number data and other information data are stored in the IC memory card 28, the control proceeds to step 1414, in which the release switch button 16 is enabled. Then, at step 1415, the counter number of the counter n is incremented by 1. Thereafter, the control returns to step 1403, and is ready for a next photographing operation.

When the next photographing operation is executed, without turning OFF the power switch 80, the control proceeds from step 1412 directly to step 1416 (n=1), in which the following calculations are executed:

$$\Delta[PD] \leftarrow [PD]_n - [PD]_{n-1}$$

$$\Delta[AD] \leftarrow [AD]_n - [AD]_{n-1}$$

Of course, as is apparent from the foregoing, in the the photogrammetric measurement, as shown in FIG. 10, the differential-positional data $\Delta[PD]$ represents the three-dimensional coordinate data $(X_0, Y_0, Z_0)$ of the photographing position $M_2$, and the differential-angular data $\Delta[AD]$ represents the three-dimensional angular coordinate data $(\alpha_0, \beta_0, \gamma_0)$ of the optical axis $O_2$.

At step 1417, the pixel signals are outputted from the memory 56 to the memory-card driver circuit 58, by which the outputted pixel signals are stored as a frame of pixel data in the IC memory card 28. At this time, the positional data $[PD]_n$, the differential-positional data $\Delta[PD]$, the angular data $[AD]_n$, and the differential-angular data $\Delta[AD]$ are also stored, along with frame-number data and other information data, in the IC memory-card 28. Note, the differential-positional data $\Delta[PD]$ and the differential-angular data $\Delta[AD]$ may be stored in the reserve area of the IC memory card 28 (FIG. 6).

In short, according to the photographing-operation routine as shown in FIGS. 14 and 15, when a series of photographing operations is consecutively executed, without turning OFF the power switch 80, a present frame of pixel data, obtained by each photographing operation, includes relative-positional data $(\Delta[PD])$ and relative-angular data $(\Delta[AD])$ being derived with respect to the immediately prior frame of pixel data.

In the photogrammetric measurement, as shown in FIG. 12, two consecutive pictures are frequently selected as a set of first and second pictures, as shown in FIGS. 8 and 9. In this case, the calculations, executed in step 1201 of the photogrammetric measurement routine shown in FIG. 12, are unnecessary.

Figure 16:
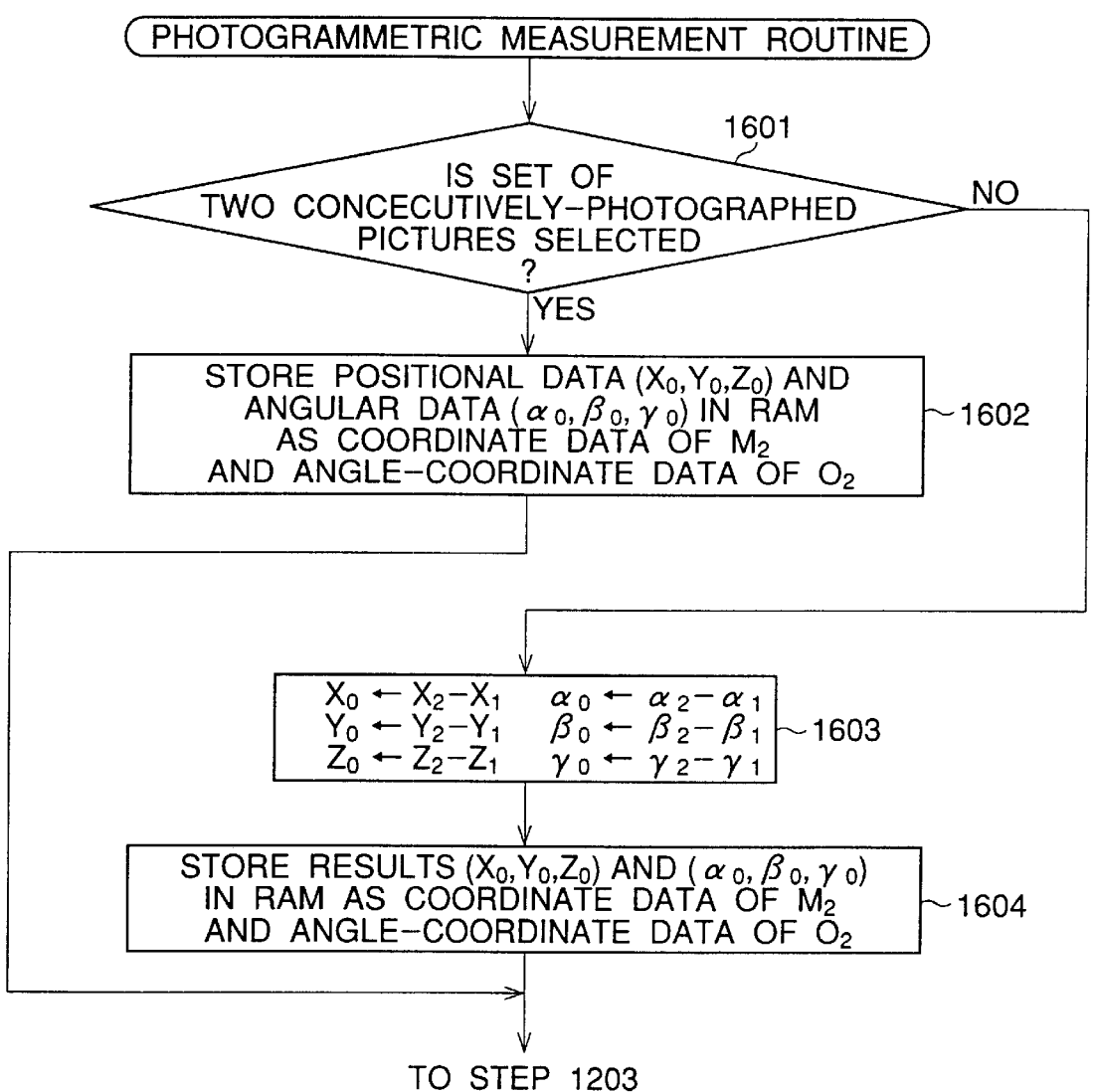
FIG. 16 is a part of a flowchart showing a modification of the photogrammetric measurement routine shown in FIG. 12.

FIG. 16 shows a modification of the photogrammetric measurement routine, shown in FIG. 12, using the data, stored in the IC memory card 28, obtained using the photographing-operation routine of FIGS. 14 and 15.

At step 1601, it is determined whether or not a set of two consecutively-photographed pictures is selected, corresponding to the respective first and second pictures shown in FIGS. 8 and 9. When the set of two consecutively-photographed pictures is selected, the control proceeds step to 1602, in which the differential-positional data $\Delta[PD]$ and the differential-angular data $\Delta[AD]$, corresponding to the latter picture of the two consecutively-photographed pictures, are temporarily stored as three-dimensional coordinate data $(X_0, Y_0, Z_0)$ of the photographing position $M_2$ and three-dimensional angular coordinate data $(\alpha_0, \beta_0, \gamma_0)$ of the optical axis $O_2$ in the RAM of the computer 90.

On the other hand, when a set of two consecutively-photographed pictures is not selected, the control proceeds from 1601 to step 1603, in which the calculations are executed in the same manner as in step 1201 of FIG. 12. Then, at step 1604, the same routine as in step 1201 is executed.

According to the modification of the photogrammetric measurement routine shown in FIG. 16, when the set of two consecutively-photographed pictures is selected, the differential-positional data $\Delta[PD]$ or the three-dimensional coordinate data $(X_0, Y_0, Z_0)$ of the photographing position $M_2$, and the differential-angular data $\Delta[AD]$ or the three-dimensional angular coordinate data $(\alpha_0, \beta_0, \gamma_0)$ of the optical axis $O_2$ can be directly obtained from the IC memory card 28, whereby the execution of the steps 1603 and 1604 are unnecessary. Namely, the photogrammetric measurement process can be further simplifed.

In the second embodiment shown in FIGS. 14 and 15, although the positional data $[PD]_n$, the differential-positional data $\Delta[PD]$, the angular data $[AD]_n$ and the differential-angular data $\Delta[AD]$ are also stored, along with frame-number data and other information data, in the IC memory-card 28, the storage of the positional data $[PD]_n$ and the angular data $[AD]_n$ may be omitted, thereby saving the capacity of the IC memory card 28.

As is apparent from the foregoing, since the camera, according to the present invention, is provided with a relative-position-detecting system for deriving a relative-positional relationship between different photographing positions, it is possible to dexterously produce a survey map in a computer in which the photogrammetric measurement routine is executed.

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Applications No. 9-013138 (filed on Jan. 8, 1997), and No. 9-268066 (filed on Sep. 12, 1997) which are expressly incorporated herein, by reference, in their entireties.

What is claimed is:

1. A camera for photogrammetric analytical measurement, with photography consecutively performed at different photographing positions, comprising:

a relative-position-detecting system associated with a three-dimensional coordinate system defined in the camera, the relative-position-detecting system detecting a relative-positional relationship in three dimensions of two consecutive different photographing positions; and a memory medium that stores image data of a photograph from the camera at the latter of the two consecutive different photographing positions and photographing-positional information derived from the relative-positional relationship detected by said relative-position-detecting system, the photographing-positional information representing the latter of said two consecutive different photographing positions, wherein said relative-position-detecting system includes:
three respective rotational-angle sensors that detect rotational-angular movement data around first, second and third axes of said three-dimensional coordinate system;

three respective acceleration sensors that detect acceleration data along the first, second and third axes of said three-dimensional coordinate system;

a sensor control system that controls said rotational-angle sensors and said acceleration sensors such that the rotational-angular movement data and the acceleration data are successively retrieved therefrom at a first regular interval of time after the camera is powered ON;

a first calculator that successively calculates relative-three-dimensional angular data of the camera based on said rotational-angular movement data retrieved from said rotational-angle sensors at a second regular interval of time which is longer than said first regular interval of time, an orientation of the camera at a time when the camera is powered ON being defined as initial three-dimensional angular data;

a second calculator that successively calculates relative-three-dimensional translational movement data of the camera, based on said acceleration data retrieved from said acceleration sensors at said second regular interval of time;

a third calculator that calculates relative-three-dimensional positional data based on said relative-three-dimensional translational movement data calculated by said second calculator, a position of the camera at a time when the camera is powered ON being defined as initial three-dimensional positional data;

a fourth calculator that calculates differential-angular data with respect to the relative-three-dimensional angular data derived from said two consecutive different photographing positions when a photographing operation is performed at the latter of said two consecutive different photographing positions, said fourth calculator calculating differential-angular data between said initial three-dimensional angular data and the relative-three-dimensional angular data derived from the photographing position at which a first photographing operation is performed; and a fifth calculator that calculates differential-positional data with respect to the relative-three-dimensional positional data derived from said two consecutive different photographing positions when the photographing operation is performed at the latter of said two consecutive different photographing positions, said fifth calculator calculating differential-positional data between said initial three-dimensional positional data and the relative-three-dimensional positional data derived from the photographing position at which the first photographing operation is performed, both the differential-angular data and the differential-positional data, calculated by said fourth and fifth calculators, being stored in said memory medium as the photographing-positional information representing the latter of said two consecutive different photographing positions.

2. A camera as set forth in claim 1, wherein both the relative-three-dimensional angular data and the relative-three-dimensional positional data, calculated by said first and third calculators with respect to the latter one of said two consecutive different photographing positions, are further stored in said memory medium as the photographing-positional information representing the latter one of said two consecutive different photographing positions.

3. A camera as set forth in claim 1, wherein both the relative-three-dimensional angular data and the relative-three-dimensional positional data, calculated by said first and third calculators with respect to the former of said two consecutive different photographing positions, are stored in said memory medium as a photographing-positional information representing the former of said two consecutive different photographing positions when an initial photographing operation is performed at the former of said two consecutive different photographing positions after the camera is powered ON.

4. A camera as set forth in claim 1, wherein an origin of said three-dimensional coordinate system is situated at a suitable position fixed with respect to the camera.

5. A camera as set forth in claim 4, wherein said suitable fixed position is a back principal point of the camera.

6. A camera as set forth in claim 4, wherein the first axis of said three-dimensional coordinate system extends vertically with respect to the Earth, and the second and third axes thereof extend horizontally from said origin so as to be perpendicular to each other.

7. A camera as set forth in claim 6, wherein the rotational-angle sensor that detects the rotational-angular movement around the first axis of said three-dimensional coordinate system includes a magnetic azimuth sensor.

8. A camera as set forth in claim 1, wherein said memory medium is detachably loadable in the camera.

9. A memory medium that stores image data photographed by a camera and photographing-positional information representing each of a plurality of different photographing positions at which a photographing operation is consecutively performed, wherein said photographing-positional information includes differential-angular data, with respect to an initial relative-three-dimensional angular data derived from an orientation of the camera at an initial photographing position at a time the camera is powered ON and a subsequent relative-three-dimensional angular data derived from an orientation of the camera at a subsequent different photographing position, and differential-positional data, with respect to an initial relative-three-dimensional positional data derived from a position of the camera at the initial photographing position at the time the camera is powered ON and a subsequent relative-three-dimensional positional data derived from a position of the camera at the subsequent different photographing position, the differential-angular data and the differential-positional data being used as the photographing-positional information representing the subsequent different photographing position, and each of the initial relative-three-dimensional angular data and the initial relative-three-dimensional positional data being used as the photographing-positional information representing the initial photographing position at the time the camera is powered ON.

10. A memory medium as set forth in claim 9, wherein said relative-three-dimensional angular data and said relative-three-dimensional positional data are obtained with respect to a three-dimensional coordinate system defined in the camera.

11. A memory medium as set forth in claim 10, wherein an origin of said three-dimensional coordinate system is situated at a suitable position data fixed with respect to said camera.

12. A memory medium as set forth in claim 11, wherein said suitable fixed position is a back principal point of the camera.

13. A memory medium as set forth in claim 10, wherein said three-dimensional coordinate system has a first axis extending vertically with respect to the Earth, and second and third axes extending horizontally from the origin of said three-dimensional coordinate system so as to be perpendicular to each other.

* * * * *